(12) United States Patent
Talbot et al.

(10) Patent No.: US 8,237,609 B2
(45) Date of Patent: Aug. 7, 2012

(54) GNSS POSITION COASTING

(75) Inventors: Nicholas Charles Talbot, Ashburton (AU); Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 294 days.

(21) Appl. No.: 12/660,080

(22) Filed: Feb. 20, 2010

(65) Prior Publication Data
US 2010/0214162 A1 Aug. 26, 2010

Related U.S. Application Data

(60) Provisional application No. 61/189,382, filed on Aug. 19, 2008, provisional application No. 61/208,340, filed on Feb. 22, 2009, provisional application No. 61/337,980, filed on Feb. 14, 2010.

(51) Int. Cl.
*G01S 19/44* (2010.01)
(52) U.S. Cl. .................................. 342/357.27
(58) Field of Classification Search ............. 342/357.26, 342/357.27; 701/477
See application file for complete search history.

(56) References Cited

U.S. PATENT DOCUMENTS

| | | |
|---|---|---|
| 5,477,458 A | 12/1995 | Loomis |
| 5,512,905 A | 4/1996 | Nichols et al. |
| 5,519,620 A | 5/1996 | Talbot et al. |
| 5,572,218 A | 11/1996 | Cohen et al. |
| 5,590,043 A | 12/1996 | McBurney |
| 5,740,048 A | 4/1998 | Abel et al. |

(Continued)

FOREIGN PATENT DOCUMENTS

EP 1 262 789 A2 4/2002
(Continued)

OTHER PUBLICATIONS

M. Efe et al., A Tracking Algorithm for Both Highly Maneuvering and Nonmaneuvering Targets, Proceedings of the 36th Conference on Decision & Control, San Diego, California USA, Dec. 1999, pp. 3150-3155.

(Continued)

*Primary Examiner* — Jack W Keith
*Assistant Examiner* — Fred H Mull
(74) *Attorney, Agent, or Firm* — Bruce D. Riter

(57) ABSTRACT

Methods and apparatus are presented for determining a position of an antenna of a GNSS rover from observations of GNSS signals collected at the antenna over multiple epochs and from correction data for at least one of the epochs. A first-epoch rover position relative to a base location is determined for a first epoch using a single-differencing process based on one of (i) fixed carrier-phase ambiguities and (ii) a weighted average of carrier-phase ambiguity candidates which is converged to a predetermined threshold. A second-epoch rover position relative to a base location is determined for a second epoch using a single-differencing process. A second-epoch update of the first-epoch rover position relative to the base location is determined for the second epoch using a single-differenced delta phase process and the first-epoch rover position is combined with the second-epoch update to obtain a second-epoch delta phase rover position relative to a moving base location of the second epoch. The second-epoch delta phase rover position is selected as reliable if the second-epoch rover position is not based on one of (i) fixed carrier-phase ambiguities and (ii) a weighted average of carrier-phase ambiguity candidates which is converged to a predetermined threshold.

6 Claims, 17 Drawing Sheets

U.S. PATENT DOCUMENTS

Figure 1:
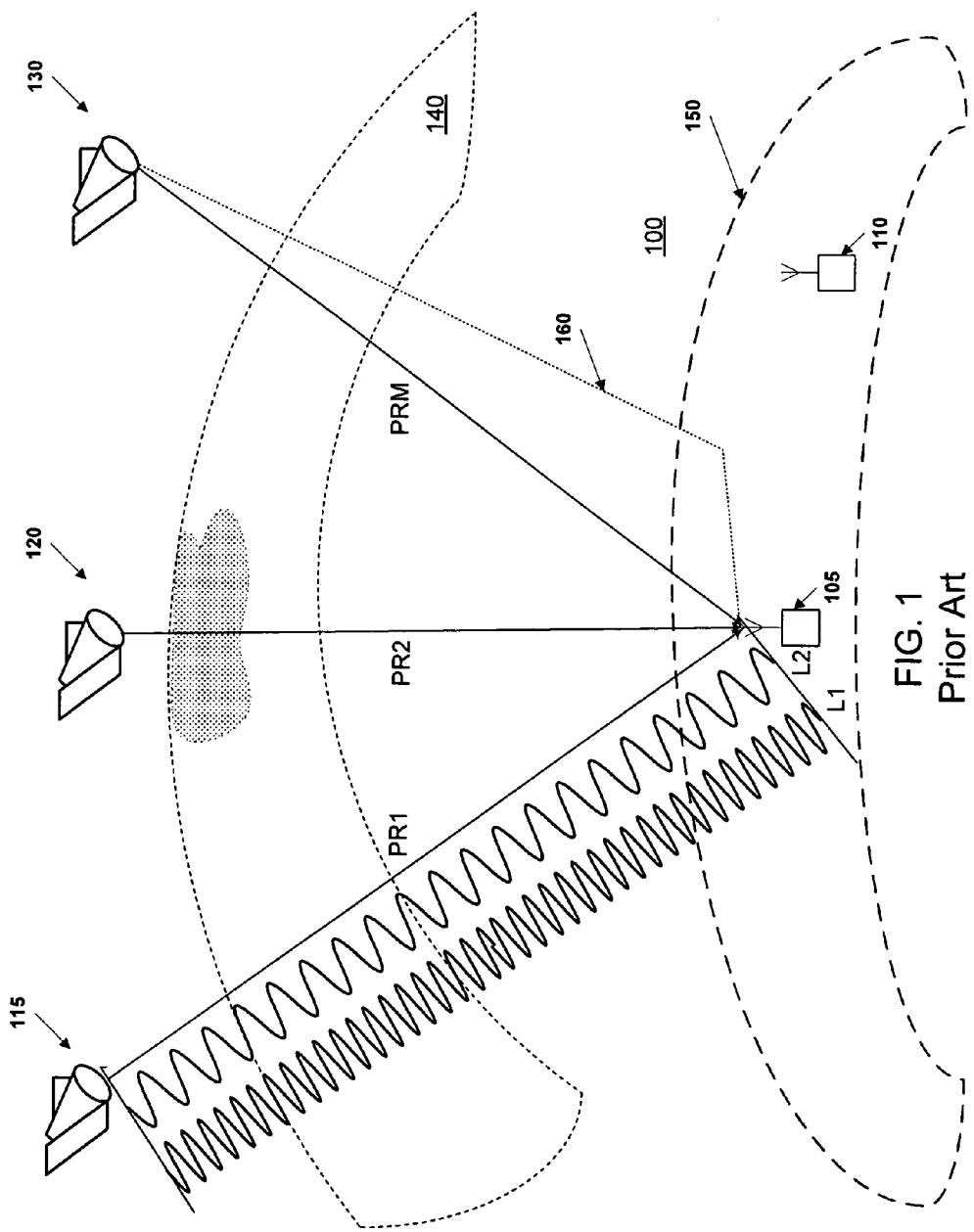

| | | | |
|---|---|---|---|
| 5,828,336 | A | 10/1998 | Yunck et al. |
| 5,991,691 | A | 11/1999 | Johnson |
| 5,999,123 | A | 12/1999 | Disselkoen et al. |
| 6,198,430 | B1 | 3/2001 | Hwang et al. |
| 6,324,473 | B1 | 11/2001 | Eschenbach |
| 6,397,147 | B1 | 5/2002 | Whitehead |
| 6,453,238 | B1 | 9/2002 | Brodie et al. |
| 6,490,524 | B1 | 12/2002 | White et al. |
| 6,529,830 | B1 | 3/2003 | Eschenbach |
| 6,664,923 | B1 | 12/2003 | Ford |
| 6,741,935 | B1 | 5/2004 | Eschenbach |
| 6,810,324 | B1 | 10/2004 | Nadkarni |
| 6,879,283 | B1 | 4/2005 | Bird et al. |
| 6,934,632 | B2 | 8/2005 | Hatch |
| 7,119,741 | B2 | 10/2006 | Sharpe et al. |
| 7,126,527 | B1 | 10/2006 | Bajikar |
| 7,193,559 | B2 | 3/2007 | Ford et al. |
| 7,312,747 | B2 | 12/2007 | Vollath et al. |
| 7,432,853 | B2 | 10/2008 | Vollath |
| 7,498,979 | B2 | 3/2009 | Liu et al. |
| 7,511,661 | B2 | 3/2009 | Hatch et al. |
| 7,538,721 | B2 | 5/2009 | Vollath et al. |
| 7,576,690 | B2 | 8/2009 | Vollath |
| 7,589,668 | B2 | 9/2009 | Vollath et al. |
| 7,692,578 | B2 | 4/2010 | Vollath et al. |
| 7,746,272 | B2 | 6/2010 | Vollath |
| 7,755,542 | B2 | 7/2010 | Chen et al. |
| 7,868,820 | B2 | 1/2011 | Kolb |
| 7,982,667 | B2 | 7/2011 | Vollath et al. |
| 2004/0066335 | A1 | 4/2004 | Ashjaee |
| 2005/0192027 | A1 | 9/2005 | Kim et al. |
| 2007/0182628 | A1 | 8/2007 | Pomerantz et al. |
| 2008/0165053 | A1* | 7/2008 | Liu et al. ............ 342/357.03 |
| 2008/0238765 | A1 | 10/2008 | Zhang et al. |
| 2009/0184868 | A1 | 7/2009 | Liu et al. |
| 2009/0184869 | A1 | 7/2009 | Talbot et al. |
| 2010/0141515 | A1 | 6/2010 | Doucet et al. |
| 2010/0253575 | A1 | 10/2010 | Vollath |
| 2011/0140959 | A1 | 6/2011 | Vollath |
| 2011/0148698 | A1 | 6/2011 | Vollath |
| 2011/0156949 | A1 | 6/2011 | Vollath et al. |

FOREIGN PATENT DOCUMENTS

| | | |
|---|---|---|
| WO | 2005/045463 A1 | 5/2005 |
| WO | 2007/032947 A1 | 3/2007 |
| WO | 2008/008099 A2 | 1/2008 |
| WO | 2008/048242 A2 | 4/2008 |
| WO | 2008/051201 A2 | 5/2008 |
| WO | 2008/054371 A2 | 5/2008 |
| WO | 2009/000314 A1 | 12/2008 |
| WO | 2009/056363 A1 | 5/2009 |
| WO | 2009/058213 A2 | 5/2009 |
| WO | 2010/021656 A2 | 2/2010 |
| WO | 2010/021657 A2 | 2/2010 |
| WO | 2010/021658 A2 | 2/2010 |
| WO | 2010/021659 A2 | 2/2010 |
| WO | 2010/021660 A2 | 2/2010 |
| WO | 2010/042441 A1 | 4/2010 |
| WO | 2010/096158 A2 | 8/2010 |
| WO | 2010/096159 A2 | 8/2010 |
| WO | 2010/096190 A2 | 8/2010 |
| WO | 2011/034614 A2 | 3/2011 |
| WO | 2011/034615 A2 | 3/2011 |
| WO | 2011/034616 A2 | 3/2011 |
| WO | 2011/034617 A2 | 3/2011 |
| WO | 2011/034624 A2 | 3/2011 |

OTHER PUBLICATIONS

A. El-Rabbany, Introduction to GPS, 2d Ed., 2006, Chapter 5, pp. 65-82.

T. Ford et al., New Positioning Filter: Phase Smoothing in the Position Domain, Proceedings of the 15th International Technical Meeting of the Satellite Division of the Institute of Navigation Ion GPS 2002, Sep. 24-27, 2002, Portland, Oregon, pp. 1850-1862.

B. Hofmann-Wellenhof et al., Global Positioning System Theory and Practice, Second Edition, 1993, pp. 115-118.

J. Kouba, A Guide to Using International GPS Service (IGS) Products, Version 21, Geodetic Survey Division, Natural Resources Canada, 2003, 2009 (34 pages).

D. Kozlov et al., Flying RTK Solution as Effective Enhancement of Conventional Float RTK, Ion GNSS 20th International Technical Meeting of the Satellite Division, Sep. 25-28, 2007, Fort Worth, TX, pp. 351-356.

H. Landau et al., Virtual Reference Stations versus Broadcast Solutions in Network RTK—Advantages and Limitations, GNSS 2003, Apr. 2003, Graz, Austria (15 pages).

P. McBurney, A Robust Approach to Reliable Real-Time Kalman Filtering, IEEE Position Location and Navigation Symposium, Mar. 20-23, 1990, pp. 549-556.

P. Misra et al., Global Positioning System: Signals, Measurements, and Performance, Second Edition, 2006, ISBN 0-9709544-1-7, pp. 146-232.

Navstar Global Positioning System Interface Specification IS-GPS-200, Revision D, Dec. 7, 2004, GPS Joint Program Office (207 pages).

G. Seeber, Satellite Geodesy, 2nd Edition, 2003, pp. 269-276.

G. Seeber, Satellite Geodesy, 2nd Edition, 2003, pp. 289-295.

P. Teunissen, Theory of Integer Equivariant Estimation with Application to GNSS, Journal of Geodesy, vol. 77, Nos. 7-8, Oct. 2003, pp. 402-410.

P. Teunissen, GNSS Best Integer Equivariant Estimation, International Association of Geodesy Symposia, 2005, vol. 128, Symposium G04, pp. 422-427.

P. Teunissen et al.; GNSS Carrier Phase Ambiguity Resolution: Challenges and Open Problems, In M.G. Sideris (ed.); Observing Our Changing Earth, International Association of Geodesy Symposia 133, 2009, pp. 785-792.

J. Traugott et al., Time Differences for Kinematic Positioning with Low-Cost Receivers, GPS World, May 1, 2008 (1 page).

J. Traugott et al. A Time-Relative Approach for Precise Positioning with a Miniaturized L1 GPS Logger, Ion-GNSS 2008, 21st International Technical Meeting of the US Institute of Navigation, Satellite Division, Sep. 16-19, Savannah, GA, pp. 1883-1894.

Trimble Survey Controller Field Guide, Version 7.50, Part No. 32969-50-ENG, Revision A, Nov. 1999 (120 pages).

Trimble Introduces New Rugged Smart Antenna for Next Generation Grade Control Systems, Trimble Navigation Limited Press Release, Feb. 7, 2006 (2 pages).

Trimble MS990 GNSS Receiver Release Notes, Version 4.12, Revision A, Dec. 2009 (16 pages).

S. Verhagen, The GNSS integer ambiguities: estimation and validation, Publications on Geodesy 58, Delft, 2005, 194 pages, ISBN-13: 978 90 6132 290 0.

* cited by examiner

US 8,237,609 B2

GNSS POSITION COASTING

CROSS REFERENCE TO RELATED APPLICATIONS

The following are related hereto and incorporated herein in their entirety by this reference: U.S. Provisional Application for Patent No. 61/208,340 filed 22 Feb. 2009; International Patent Application PCT/US/2009/004471 filed 5 Aug. 2009; International Patent Application PCT/US/2009/004473 filed 5 Aug. 2009; International Patent Application PCT/US/2009/004474 filed 5 Aug. 2009; International Patent Application PCT/US/2009/004472 filed 5 Aug. 2009; International Patent Application PCT/US/2009/004476 filed 5 Aug. 2009; U.S. Provisional Application for Patent No. 61/189,382 filed 19 Aug. 2008; U.S. patent application Ser. No. 12/224,451 filed 26 Aug. 2008, United States Patent Application Publication US 2009/0027625 A1; International Patent Application PCT/US07/05874 filed 7 Mar. 2007, International Publication No. WO 2008/008099 A2; U.S. patent application Ser. No. 11/988,763 filed 14 Jan. 2008, United States Patent Application Publication US 2009/0224969 A1; International Patent Application No. PCT/US/2006/034433 filed 5 Sep. 2006, International Publication No. WO 2007/032947 A1; U.S. Pat. No. 7,432,853 granted 7 Oct. 2008; International Patent Application No. PCT/US2004/035263 filed 22 Oct. 2004 and International Publication Number WO 2005/045463 A1; Provisional Application for U.S. Patent 61/337,980 filed 14 Feb. 2010 of Xiaoming CHEN et al.

TECHNICAL FIELD

The present invention relates to the field of Global Navigation Satellite Systems GNSS). More particularly, the present invention relates to methods and apparatus for processing of GNSS data to determine position of a rover relative to a moving base location.

BACKGROUND ART

FIG. 1 schematically illustrates a typical prior-art GNSS surveying scenario 100 in which a rover 105 and a base station 110 observe signals from GNSS satellites 115, 120, . . . 130 on multiple carrier frequencies such as carrier frequencies L1 and L2. The signals are influenced by effects of the atmosphere 140 of the Earth 150. Observation data from the rover and base station are processed to precisely determine the rover position.

Determining position of a moving rover in real-time, sometimes referred to as "real-time kinematic" surveying or "RTK" can be loosely divided into two sets of tasks: (1) estimation of carrier phase ambiguities, and (2) use of the estimated carrier phase ambiguities to estimate rover position.

A prior art approach divides the processing into float solution and search (FSS) tasks, and data preparation and position processor (DPPP) tasks. The FSS tasks serve to estimate float values for the ambiguities and then to search and resolve fixed-value carrier-phase ambiguities. The resulting ambiguity information is then used in the DPPP tasks, where a position processor uses the ambiguities together with carrier-phase observation data to produce the final reported position solution.

Figure 2:
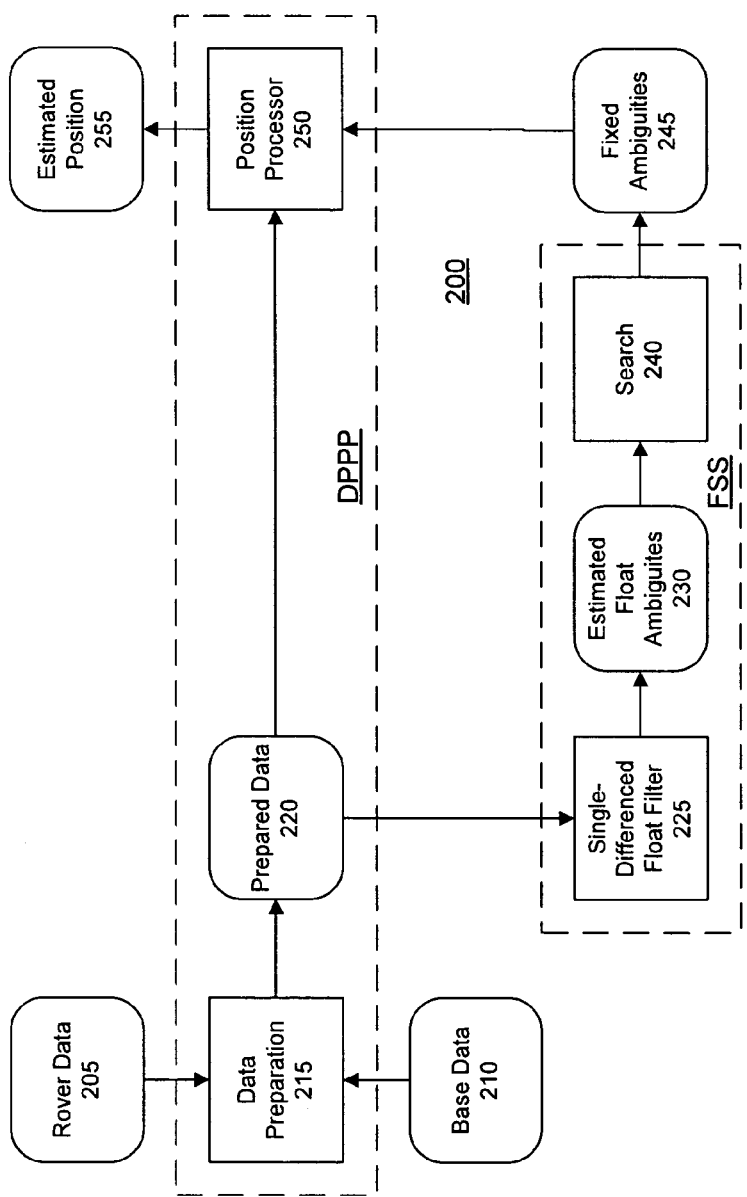

FIG. 2 schematically illustrates such a prior art approach at 200. Multi-frequency GNSS observation data 205 of a rover and multi-frequency GNSS observation data 210 of a base station are prepared at 215 to obtain a prepared data set 220 at each epoch. Preparation typically includes matching and differencing of the observations by epoch, for example. The prepared data 220 is supplied at each epoch to a single-differenced float filter (or filter banks) 225 which estimates float-valued carrier-phase ambiguities (with associated statistical data) 230. At 240 a search is conducted to identify a correct set of fixed integer ambiguities 245. As long as carrier lock is maintained at the rover and base station receivers, the fixed ambiguities 245 remain constant from epoch to epoch. These are used in a position processor 250 to estimate rover position 255 relative to the base station location from each subsequent epoch of prepared data 220.

An advantage of this approach is that, once the ambiguities are correctly fixed, a fresh position fix can be computed at each epoch of GNSS observation data, e.g., at 1 Hz or even 10 Hz, with a modest processing load which is feasible in a battery-powered rover. See, for example, U.S. Pat. No. 7,432,853. A disadvantage of this approach is that incorrect fixing of the carrier-phase ambiguities can result in a significant error in estimated rover position. Should this occur, the iterative filters used in the estimation process must be reset, incurring a delay until the ambiguities are again estimated and fixed for use in determining rover position.

Another approach avoids fixing the carrier-phase ambiguities and thus avoids the possibility that they may be incorrectly fixed. Instead, the search process determines candidate sets of carrier-phase ambiguities and their respective probabilities of correctness. A weighted average of the candidate sets is formed using, for example, the probabilities of correctness as weighting factors See for example P. Teunissen et al.; *GNSS Carrier Phase Ambiguity Resolution Challenges and Open Problems*, In M. G. Sideris (ed.); Observing our Changing Earth, International Association of Geodesy Symposia 133, Springer Verlag Berlin-Heidelberg 2009; Verhagen, Sandra, *The GNSS integer ambiguities: estimation and validation*, Publications on Geodesy 58, Delft, 2005. 194 pages, ISBN-13: 978 90 6132 290 0. ISBN-10: 90 6132 290 1; and International Patent Application PCT/US/2009/004476.

Figure 3:
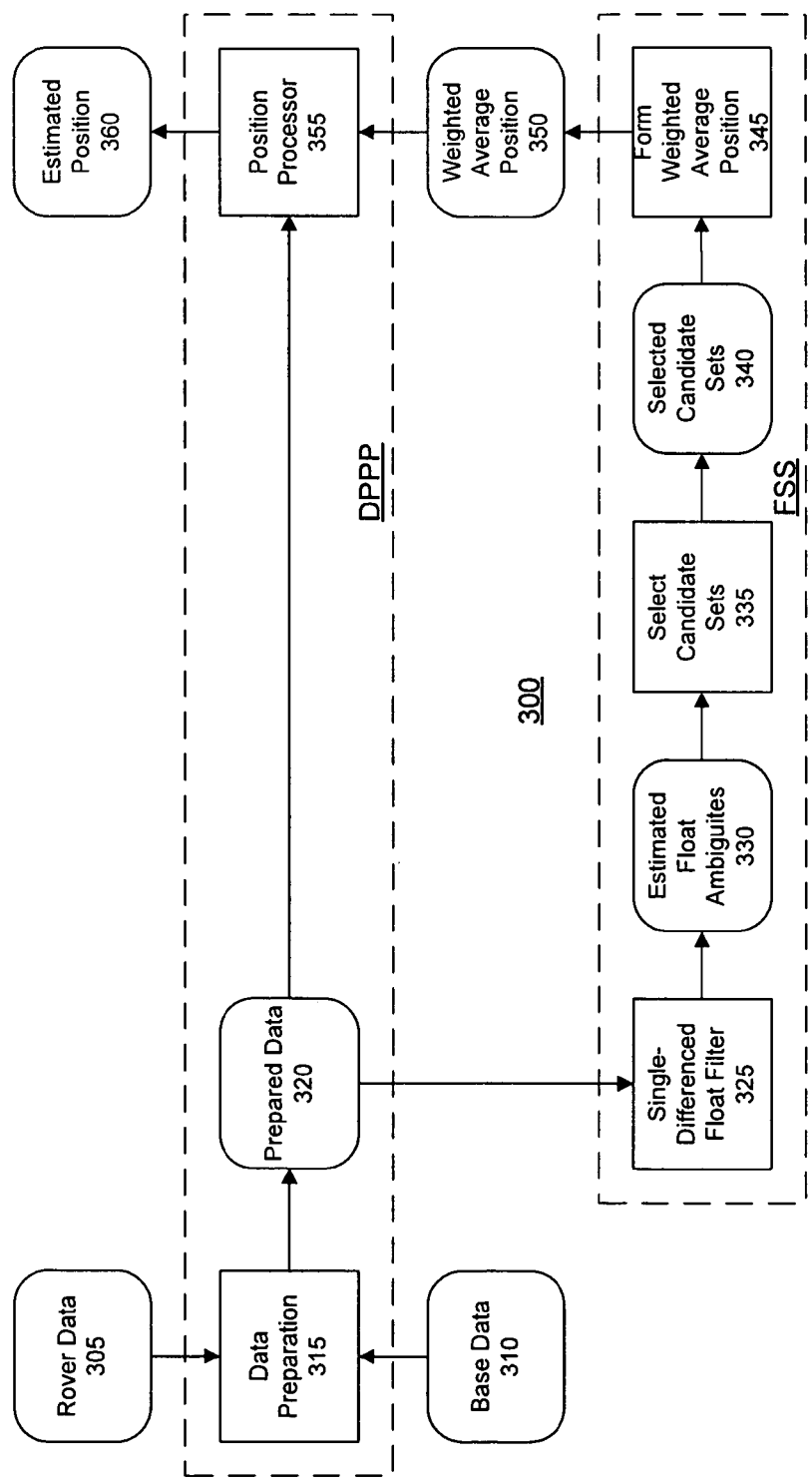

FIG. 3 schematically illustrates such a prior art approach at 300. Multi-frequency GNSS observation data 305 of a rover and multi-frequency GNSS observation data 310 of a base station are prepared at 315 to obtain a prepared data set 320 at each epoch. Preparation typically includes matching and differencing of the observations by epoch, for example. The prepared data 320 is supplied at each epoch to a single-differenced float filter (or filter banks) 325 which estimates float-valued carrier-phase ambiguities (with associated statistical data) 330. At 335 a search is conducted to identify candidate sets of possibly correct fixed integer ambiguities 340 along with statistical information such as their respective probabilities of correctness. At 345 a weighted average of the candidate sets (in the ambiguity domain) or a weighted average rover position 350 based on the candidate sets (in the position domain) is formed, using for example the probabilities of correctness as a weighting factor. The weighted average is used in a position processor 355 to estimate rover position 360 relative to the base station location from each subsequent epoch of prepared data 320.

With the weighted averaging approach, the FSS tasks takes on the role of producing position estimates every epoch, e.g., at 1 Hz, rather than just estimating and reporting ambiguities. However, many applications require position estimates at a rate greater than 1 Hz. Machine guidance, for example, requires 10 Hz position updates with minimal latency. A drawback of this approach is that it is not feasible to run the full weighted-average solution at the highest observation-data rate of the receivers in a device having limited computing power, such as in the processor of a mobile rover receiver.

The term "delta phase" refers to the time-wise differencing of GNSS carrier-phase measurements. The change in phase observed over time at a single-receiver is dependent on:
- change in rover-satellite range due to satellite motion (known from ephemeris),
- change in rover-satellite range due to motion of the receiver,
- drift in the satellite clock (known from ephemeris),
- drift in the rover receiver clock,
- change in atmospheric error (generally varies slowly in time).

So long as phase tracking is maintained on a satellite (i.e. there are no cycle slips), the carrier-phase ambiguity for that satellite remains constant. When delta phase is observed on four or more satellites simultaneously, it can be used to determine the change in rover location and change in rover receiver clock over time.

A further prior-art approach uses undifferenced delta phase positioning form high-update-rate (low-latency) RTK rover position estimates. Delta phase processing only determines changes in rover position and not the absolute position of the rover. Hence, the undifferenced delta phase position changes are combined with the position estimates derived from 1 Hz synchronized base/rover data to produce unambiguous position estimates with low latency.

Figure 4:
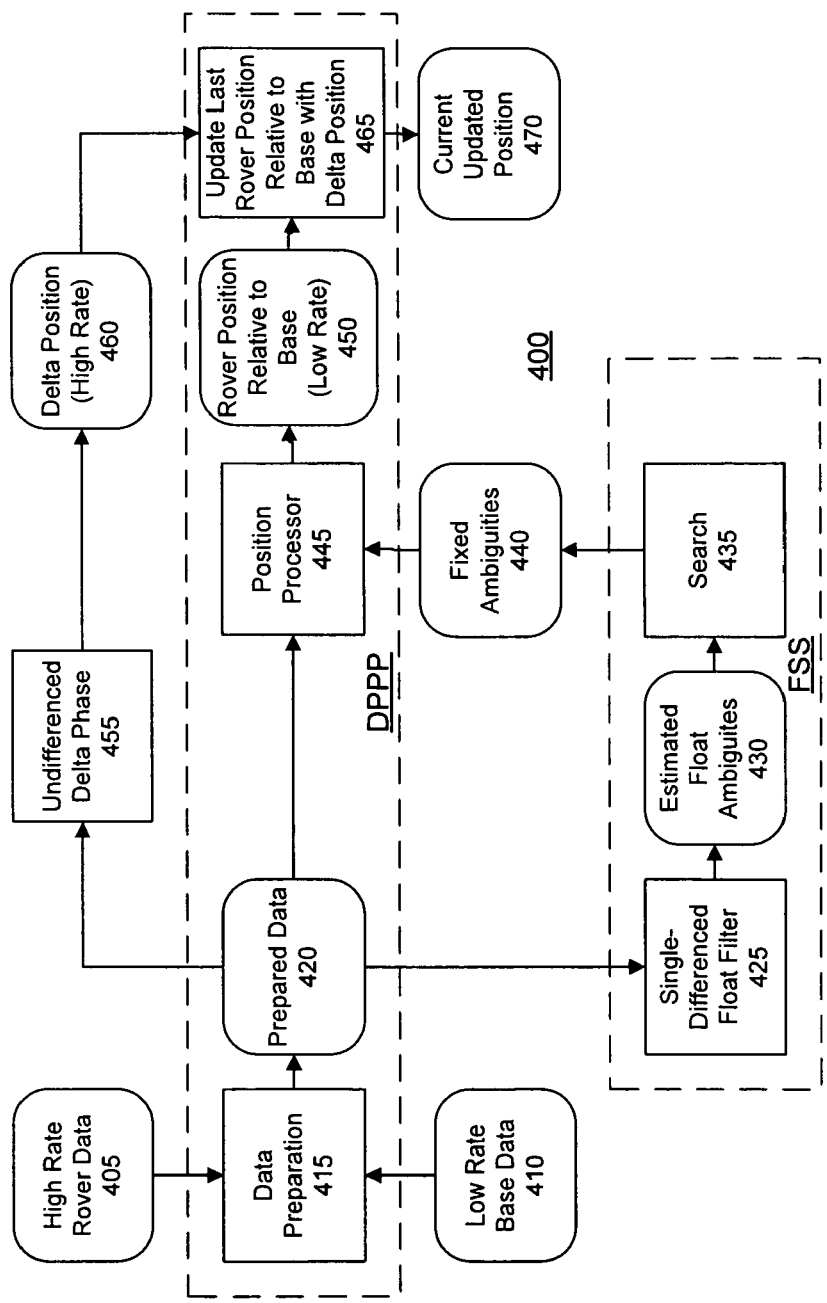

FIG. 4 schematically illustrates such a prior art approach at 400. Multi-frequency GNSS observation data 405 of a rover and multi-frequency GNSS observation data 410 of a base station are prepared at 415 to obtain a prepared data set 420 at each epoch. Preparation typically includes matching of the observations by epoch, for example. The prepared data 420 is supplied at each epoch to a single-differenced float filter (or filter banks) 425 which estimates float-valued carrier-phase ambiguities (with associated statistical data) 430. At 435 a search is conducted to identify a correct set of fixed integer ambiguities 440. As long as carrier lock is maintained at the rover and base station receivers, the fixed ambiguities 440 remain constant from epoch to epoch. These are used in a position processor 445 to estimate rover position 450 relative to the base station location from each subsequent epoch of prepared data 420. The rover position 450 is updated at a relatively low rate, such as 1 Hz. At 455 prepared data 420 is used to determine rover delta position 460 from epoch to epoch at a relatively high rate, such as 5 Hz. At 465 the latest rover position 450 relative to the base station is updated with the high-rate delta position estimates 460 to obtain a current updated position 470 at the high rate.

Figure 5:
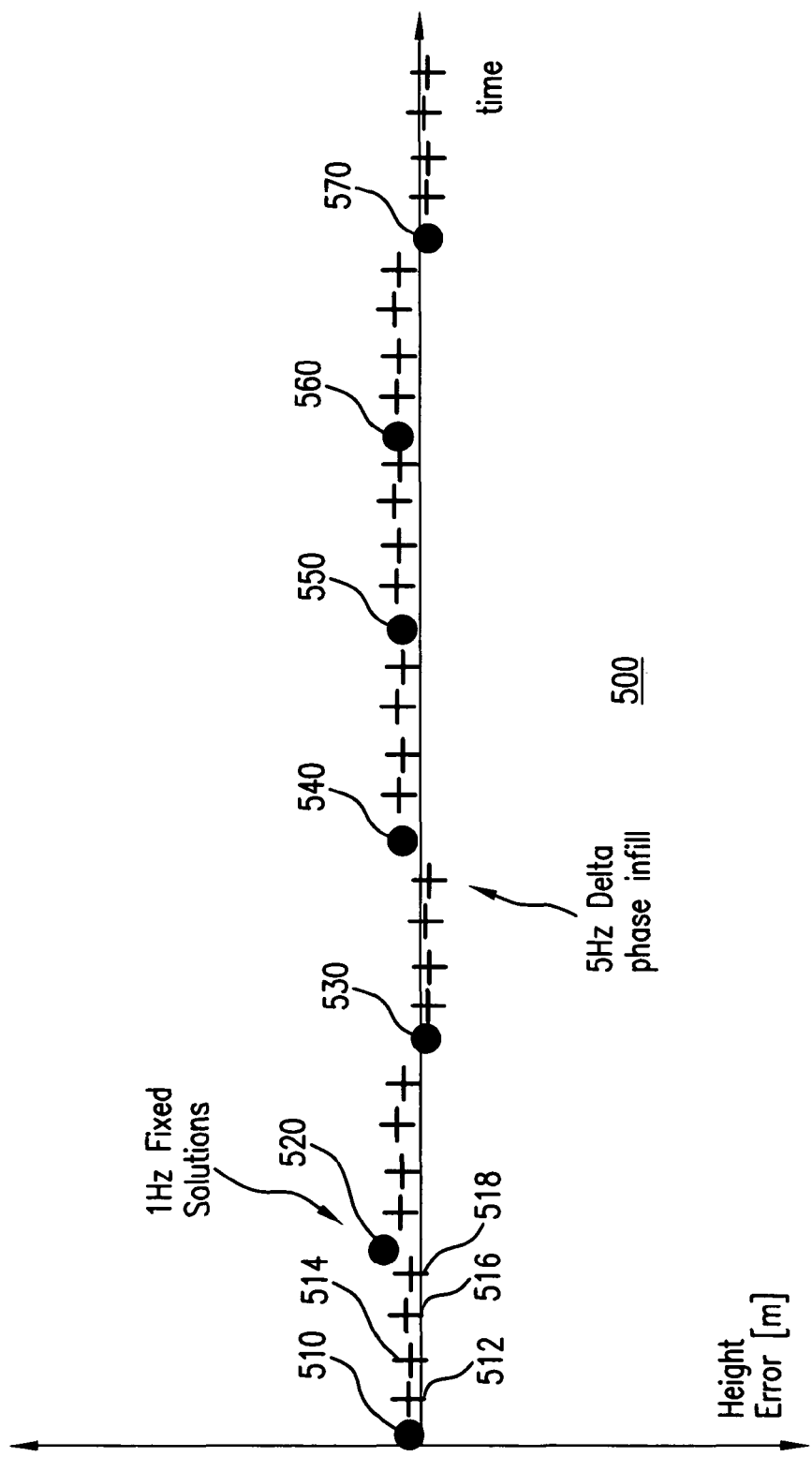

FIG. 5 graphically illustrates at 500 a sequence of position estimates using the approach of FIG. 4. In this example, rover positions 510, 520, 530, 540, 550, 560, 570 are determined from the fixed ambiguities at 1 Hz, and these are updated at a 5 Hz rate using the delta-phase position differences 512, 514, 516, 518, etc. A drawback of this approach is that unmodelled variation in the satellite clocks plus changes in the atmospheric delay cause the undifferenced delta phase position estimates to accumulate errors over time. The longer the time delta, the larger the error accumulated in the position estimates.

Single-differenced carrier-phase observations are frequently used in GNSS positioning. A single-difference is formed by subtracting base and rover data observed at the same time to a common satellite. The single-differencing process is best explained by way of the observation equations. Equations (1) and (2) show the undifferenced carrier-phase observation models, expressed in meters, for base (b) and rover (s) receivers, observed to satellite (s), at epoch time k.

$$\phi_b^s(k)=\rho_b^s(k)+T^s(k)+t_b(k)+I_b^s(k)+\tau_b^s(k)+N_b^s \quad (1)$$

$$\phi_r^s(k)=\rho_r^s(k)+T^s(k)+t_r(k)+I_r^s(k)\tau_r^s(k)+N_r^s \quad (2)$$

Where:
$\phi_b^s(k)$ Base (denoted with subscript b) receiver phase measurement to satellite s, at epoch time k (expressed in meters);
$\rho_b^s(k)$ Geometric range from receiver b, to satellite s, at epoch k;
$T^s(k)$ Satellite clock error at epoch k;
$t_b(k)$ Base receiver clock error at epoch k;
$I_b^s(k)$ Ionospheric bias for receiver b, and satellite s at epoch k;
$\tau_b^s(k)$ Tropospheric bias for receiver b, and satellite s at epoch k;
$N_b^s$ Integer carrier phase ambiguity term (scaled into meters) for satellite s and receiver b
(with analogous definitions for the rover quantities in Equation (2)).

Based on (1) and (2), the corresponding single-difference phase equation is given by:

$$\Delta\phi^s(k)=\phi_r^s(k)-\phi_b^s(k)=\Delta\rho^s(k)+\Delta t(k)+\Delta I^s(k)+\Delta\tau^s(k)+\Delta N^s \quad (3)$$

Where:
$\Delta\phi^s(k)$ Single-difference receiver phase measurement to satellite s, at epoch time k (expressed in meters);
$\Delta\rho^s(k)$ Single-difference receiver clock error at epoch k;
$\Delta t(k)$ Single-difference ionospheric bias for satellite s at epoch k;
$\Delta I^s(k)$ Single-difference tropospheric bias for satellite s at epoch k;
$\Delta\tau^s(k)$ Single-difference geometric range to satellite s, at epoch k;
$\Delta N^s$ Single-difference integer carrier phase ambiguity term (scaled into meters) for satellite s.

The satellite clock error present in the undifferenced measurement models of (1) and (2) is removed by the single-differencing process, and is therefore absent from (3). When the base and rover receiver are closely spaced (i.e. less than 20 km apart), the ionospheric and tropospheric biases are often very similar at both sites and therefore the single-difference atmospheric bias terms $\Delta I^s(k)$, and $\Delta\tau^s(k)$ approach zero and are often ignored. The single-differenced carrier-phase ambiguity term $\Delta N^s$ includes the whole number of integer cycles between base, rover and satellite at the time phase tracking commenced. In order to be able to use single-differenced carrier-phase for positioning applications it is necessary to estimate the carrier phase ambiguity term.

A single-differenced delta phase combination is formed by time-wise differencing of single-difference phase observations:

$$\delta\Delta\phi^s(k)=\Delta\phi^s(k)-\Delta\phi^s(k-1) \quad (4)$$

Where:
$\delta\Delta\phi^s(k)$ Single-difference delta phase observation formed between base and rover receivers to satellite s, at epochs (k) and (k−1).

One of the major advantages of the single-differenced delta phase approach is that because the carrier-phase ambiguity terms are constant (while carrier tracking is maintained, i.e., there is no cycle slip), they are removed from the observation model:

$$\delta\Delta\phi^s(k)=\delta\Delta\rho^s(k)+\delta\Delta t(k)+\delta\Delta I^s(k)+\delta\Delta\tau^s(k) \quad (5)$$

Although the single-differenced delta phase observation equation (5) includes ionospheric and tropospheric error terms, it is important to note that these errors are generally very small even on long baselines and for time-deltas of tens of seconds.

The quantities of interest in (5) are the base & rover receiver coordinates contained within the geometric range term:

$$\delta\Delta\rho^s(k) = \Delta\rho^s(k) - \Delta\rho^s(k-1) \quad (6)$$
$$\delta\Delta\rho^s(k) = \rho_r^s(k) - \rho_b^s(k) - [\rho_r^s(k-1) - \Delta\rho_r^s(k-1)]$$

$$\delta\Delta\rho^s(k) = \sqrt{\begin{array}{c}\{x^s(k) - x_r(k)\}^2 + \\ \{y^s(k) - y_r(k)\}^2 + \{z^s(k) - z_r(k)\}^2\end{array}} - \quad (7)$$

$$\sqrt{\begin{array}{c}\{x^s(k) - x_b(k)\}^2 + \\ \{y^s(k) - y_b(k)\}^2 + \{z^s(k) - z_b(k)\}^2\end{array}} -$$

$$\sqrt{\begin{array}{c}\{x^s(k-1) - x_r(k-1)\}^2 + \{y^s(k-1) - y_r(k-1)\}^2 + \\ \{z^s(k-1) - z_r(k-1)\}^2\end{array}} +$$

$$\sqrt{\begin{array}{c}\{x^s(k-1) - x_b(k-1)\}^2 + \{y^s(k-1) - y_b(k-1)\}^2 + \\ \{z^s(k-1) - z_b(k-1)\}^2\end{array}}$$

Where:
$x^s(k)$, $y^s(k)$, $z^s(k)$ Earth-centred, earth-fixed Cartesian coordinates of satellite s, at epoch k.
$x_r(k)$, $y_r(k)$, $z_r(k)$ Earth-centred, earth-fixed Cartesian coordinates of rover receiver, at epoch k.

The satellites' coordinates are available via the broadcast satellite ephemeris and therefore are known quantities. Similarly, the coordinates of the base receiver can be assumed to be known. The only unknown quantities remaining in (7) are the change in rover coordinates from epochs k−1 to k, and the change in receiver clock difference. That is, the single-difference delta phase observation equation is a function of the rover receiver coordinate changes and the single-differenced receiver clock delta:

$$\delta\Delta\phi^s(k) = f\{\delta x_r(k), \delta y_r(k), \delta z_r(k), \delta\Delta t(k)\} \quad (8)$$

Where the rover coordinate deltas are given by:

$$\delta x_r(k) = x_r(k) - x_r(k-1)$$
$$\delta y_r(k) = y_r(k) - y_r(k-1)$$
$$\delta z_r(k) = z_r(k) - z_r(k-1) \quad (9)$$

Single-difference delta phase observations can be formed for each satellite tracked at base and rover receivers at common time epochs according to (8). Generally a least squares or Kalman filtering approach is used to solve for the unknown quantities in (8).

Improved GNSS processing methods and apparatus are desired, especially to achieve faster convergence to a solution, improved accuracy and/or greater availability.

SUMMARY

Some embodiments of the invention provide methods and/or apparatus for determining a position of an antenna of a GNSS rover from observations of GNSS signals collected at the antenna over multiple epochs and from correction data for at least one of the epochs. A first-epoch rover position relative to a base location is determined for a first epoch using a single-differencing process based on one of (i) fixed carrier-phase ambiguities and (ii) a weighted average of carrier-phase ambiguity candidates which is converged to a predetermined threshold. A second-epoch rover position relative to a base location is determined for a second epoch using a single-differencing process. A second-epoch update of the first-epoch rover position relative to the base location is determined for the second epoch using a single-differenced delta phase process and the first-epoch rover position is combined with the second-epoch update to obtain a second-epoch delta phase rover position relative to a moving base location of the second epoch. The second-epoch delta phase rover position is selected as reliable if the second-epoch rover position is not based on one of (i) fixed carrier-phase ambiguities and (ii) a weighted average of carrier-phase ambiguity candidates which is converged to a predetermined threshold.

In some embodiments the first-epoch rover position is determined using base correction data comprising at least one of: correction data prepared from observations of a physical base station, correction data prepared from observations of a network of reference stations, correction data prepared from observations of a global network of reference stations, and correction data prepared from observations of a regional network of reference stations.

Some embodiments further include checking accuracy of the second-epoch update of the first-epoch rover position.

BRIEF DESCRIPTION OF DRAWING FIGURES

Figure 6:
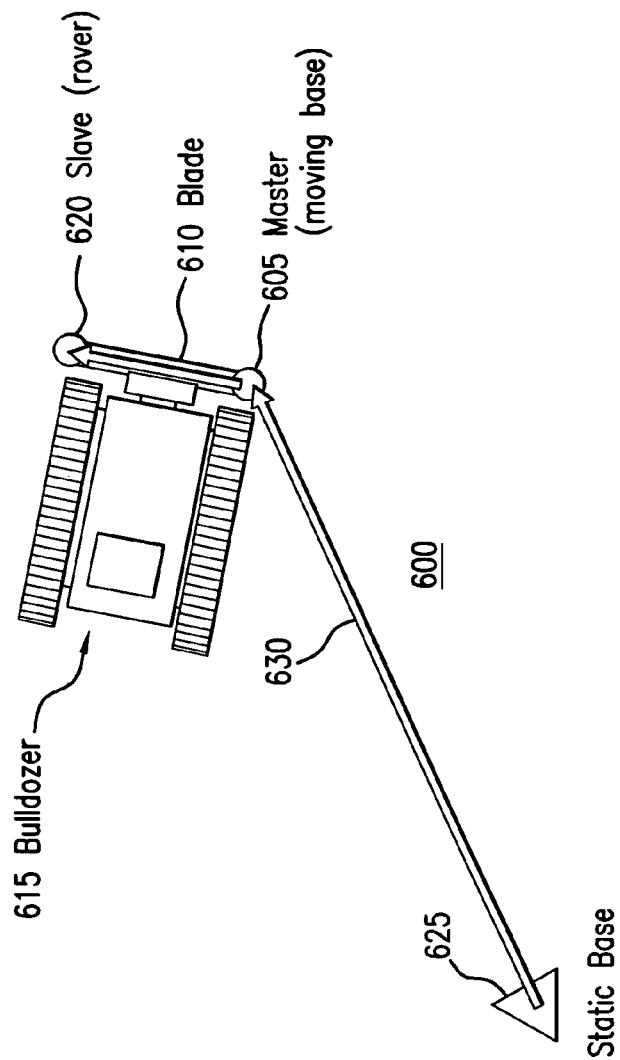
Figure 7:
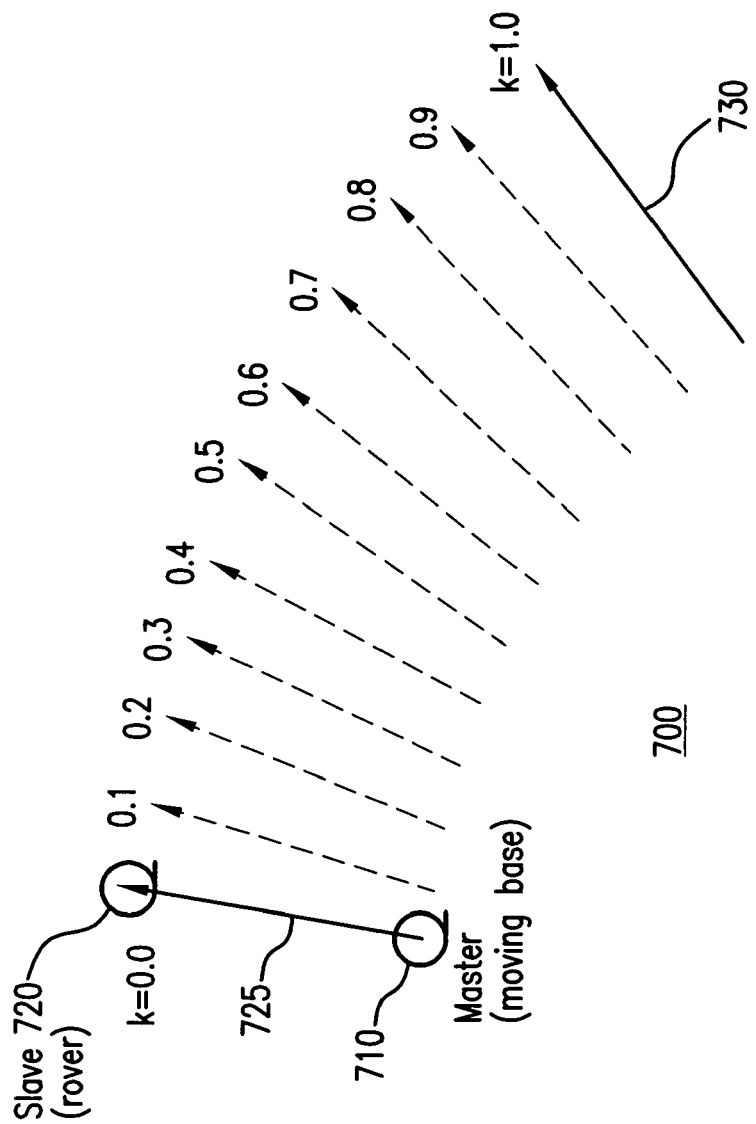
Figure 8:
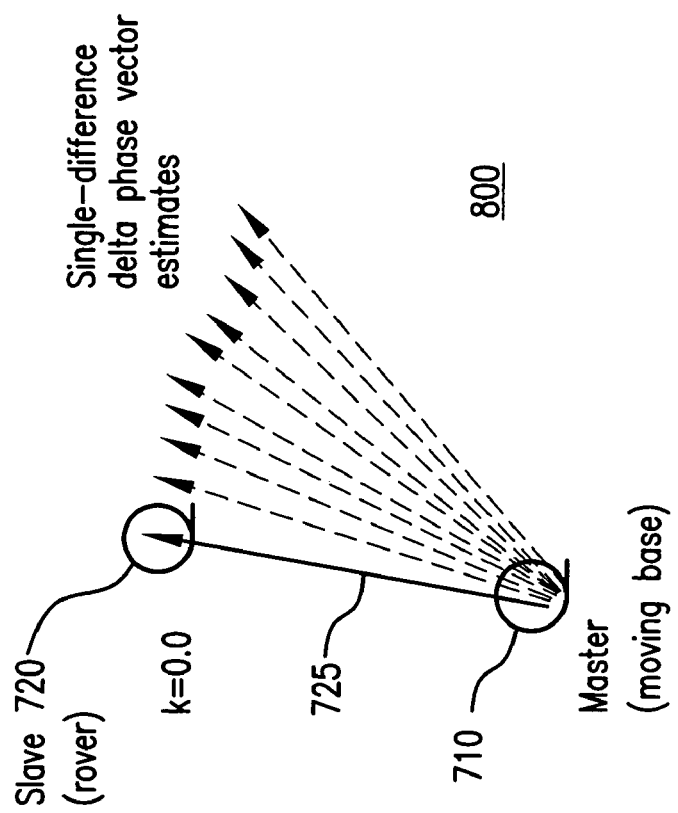
Figure 9:
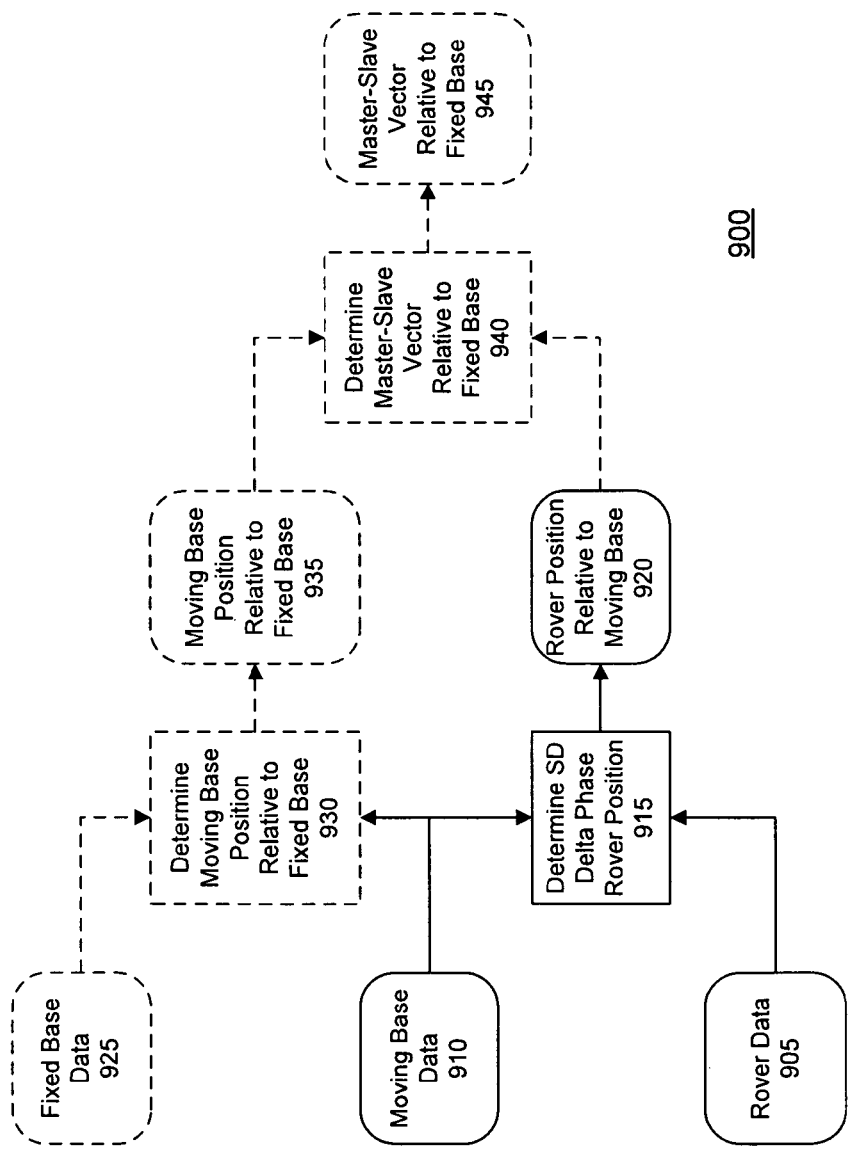
Figure 10:
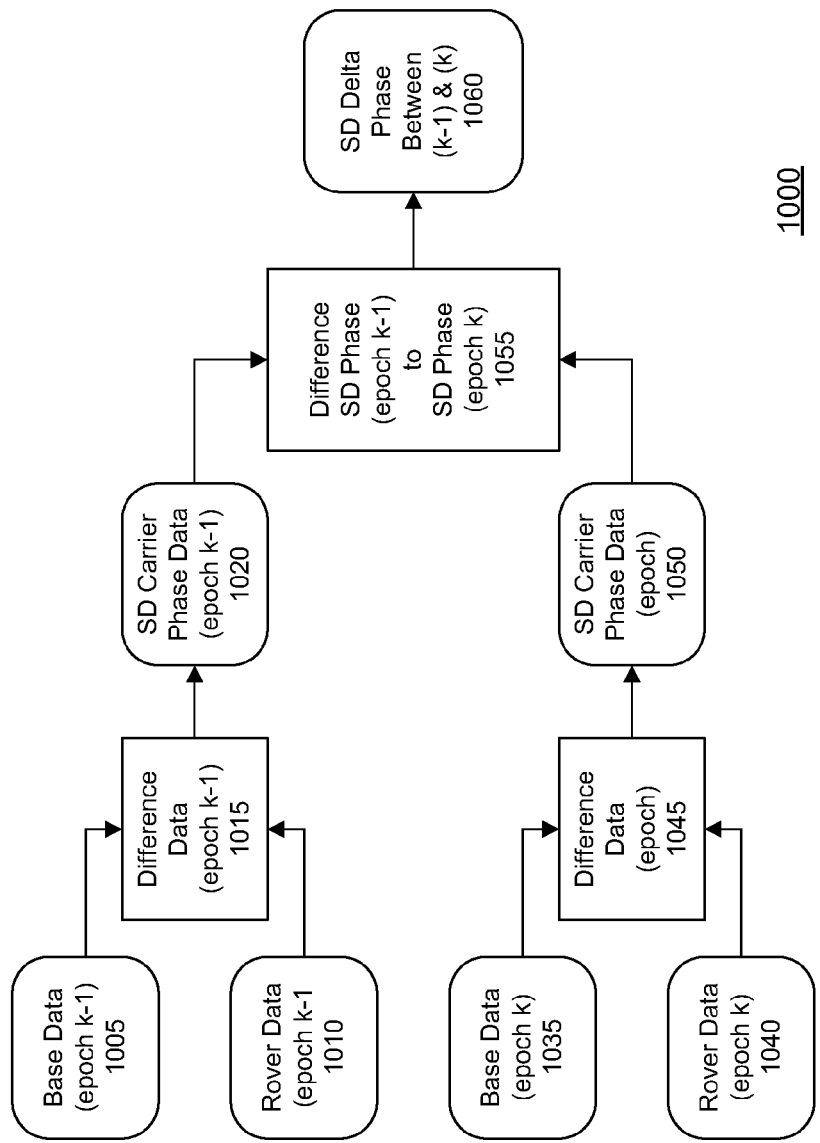
Figure 11:
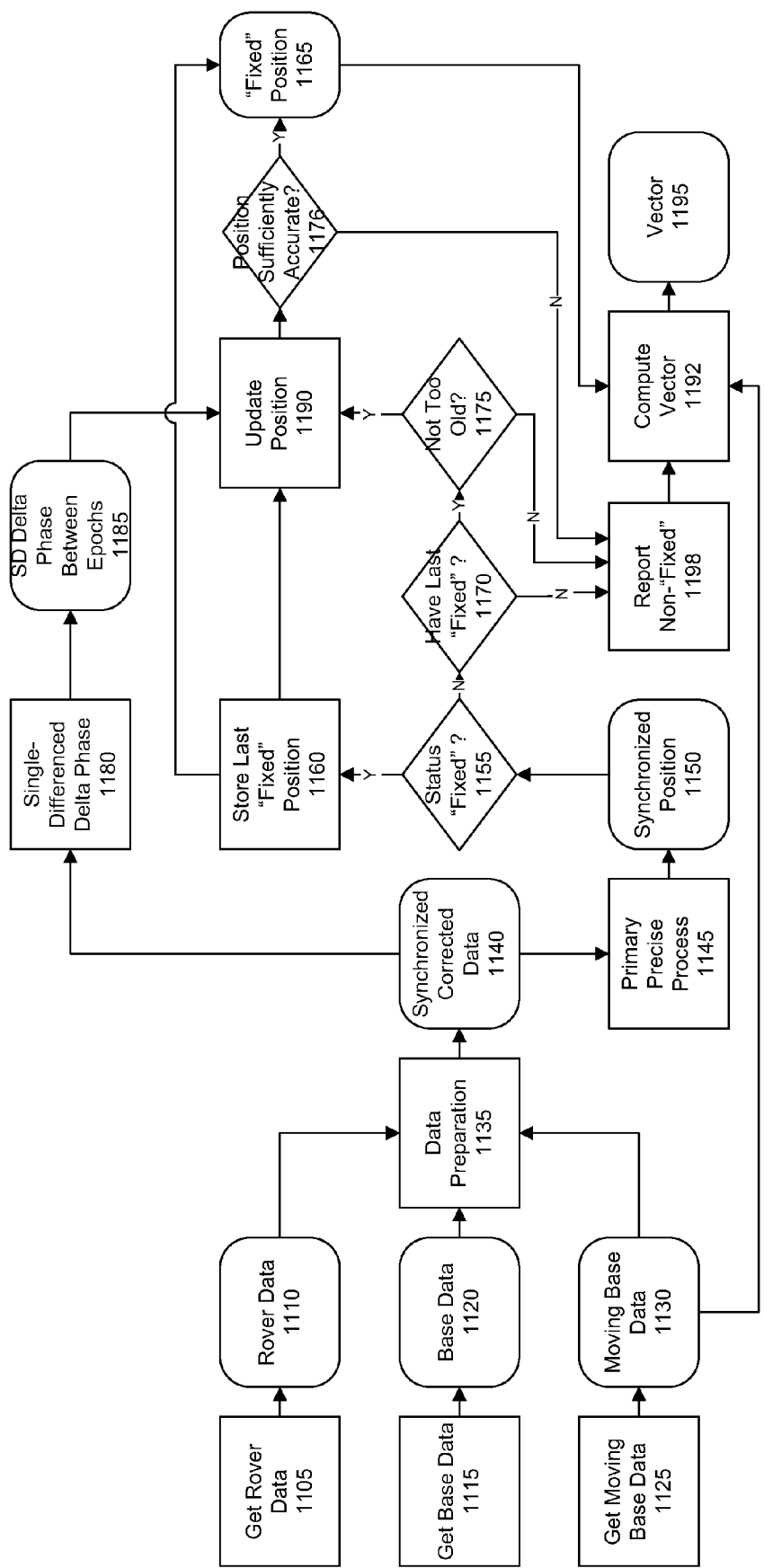
Figure 12:
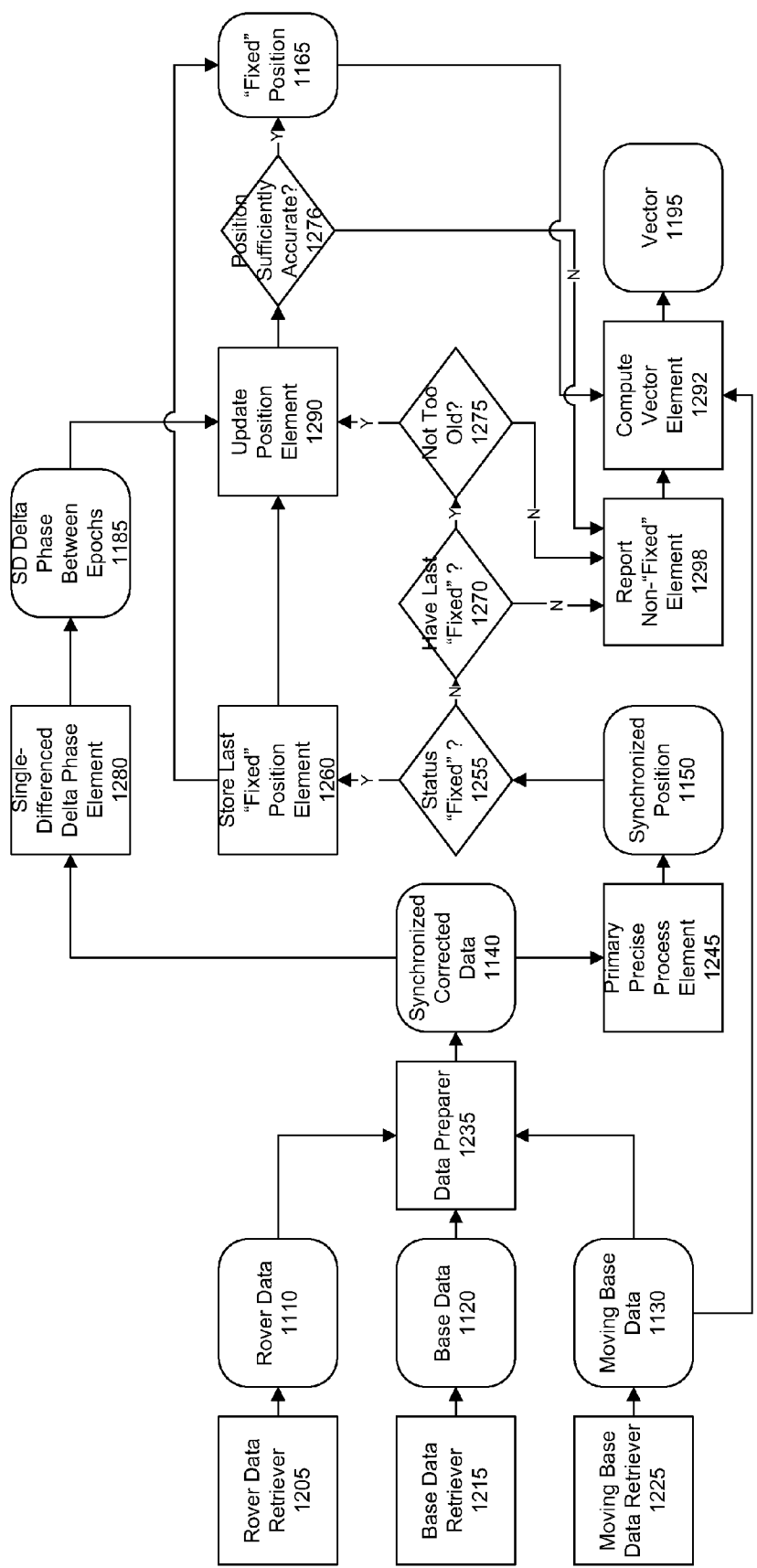
Figure 13:
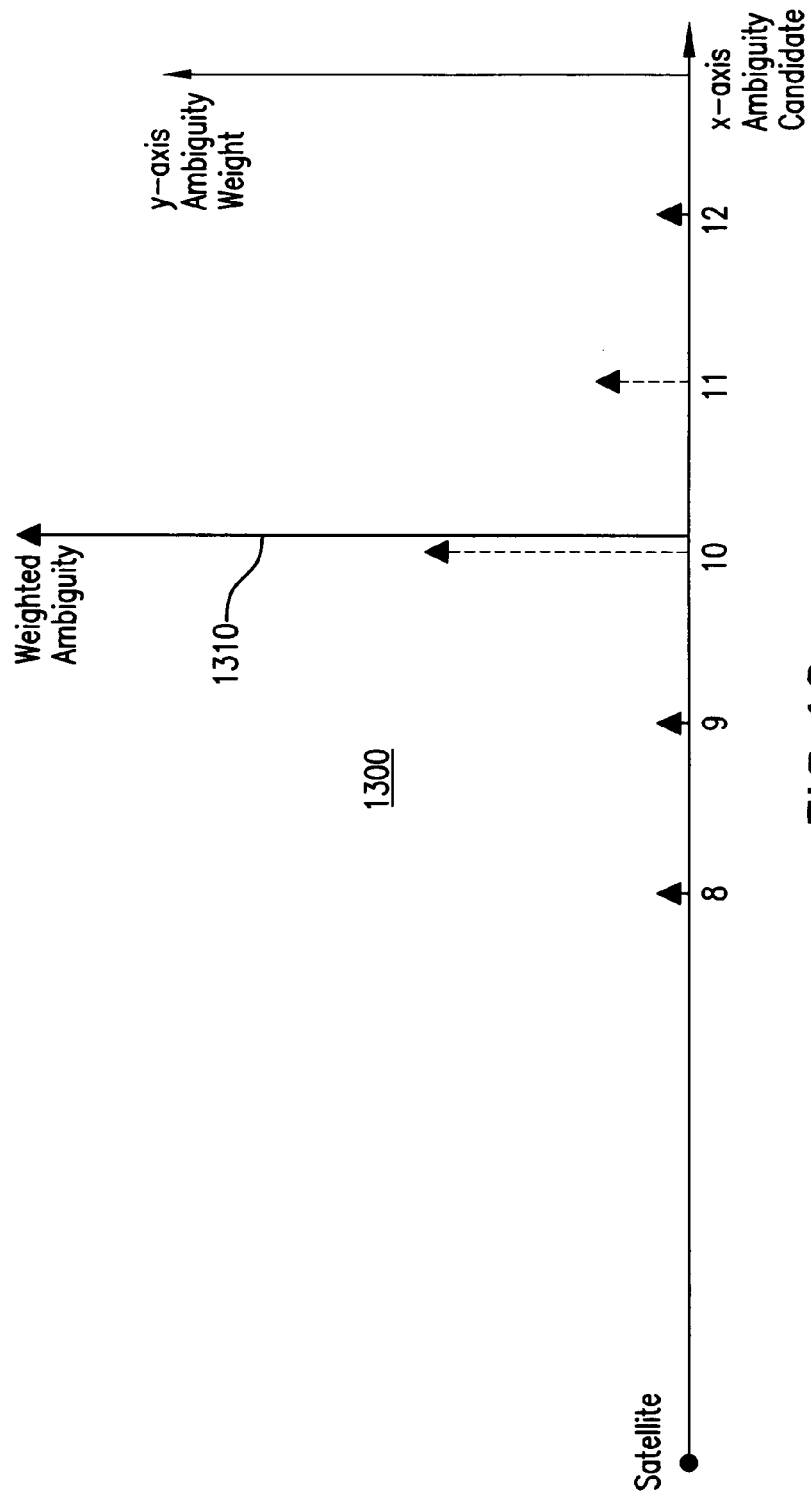
Figure 14:
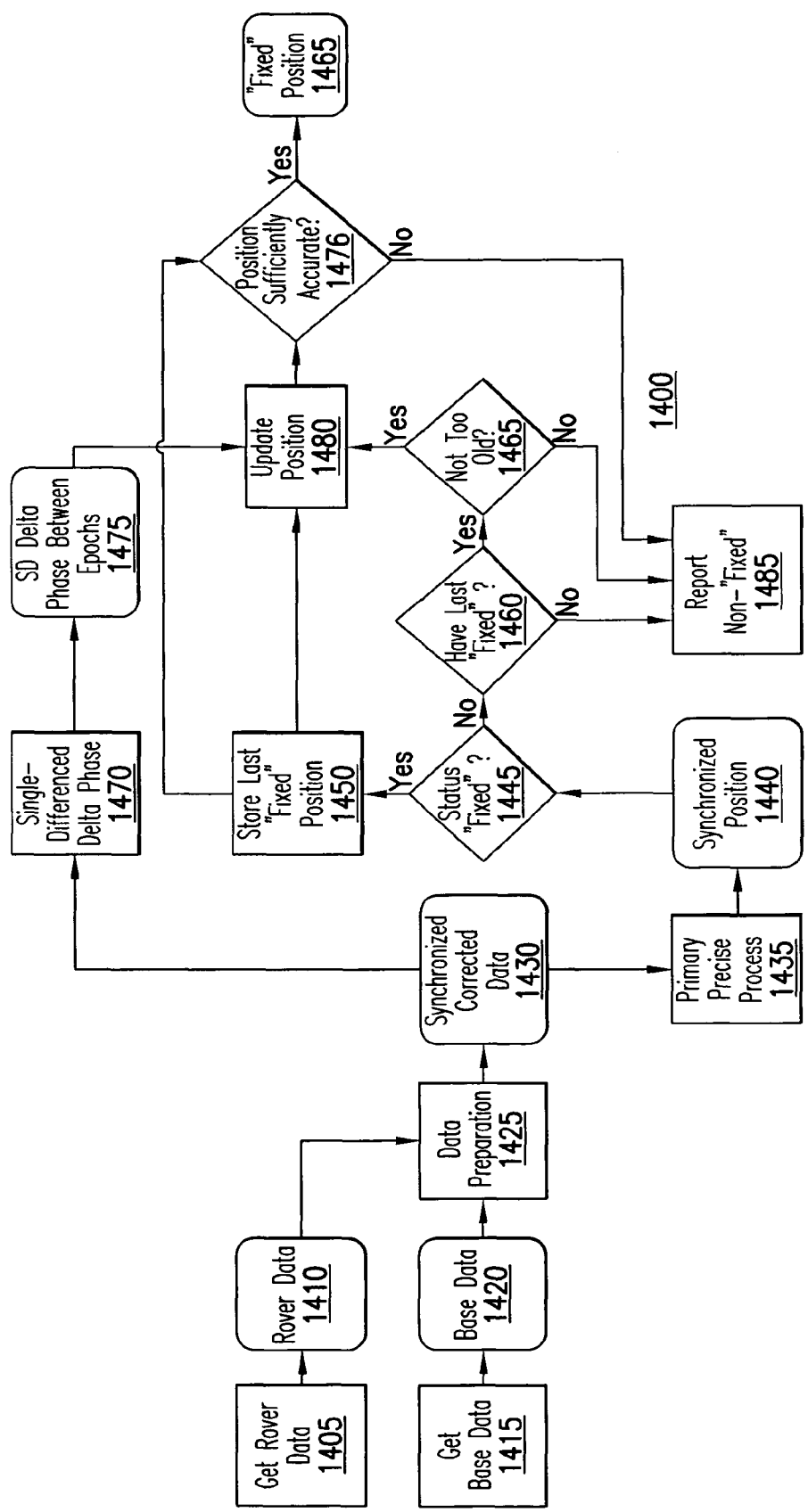
Figure 15:
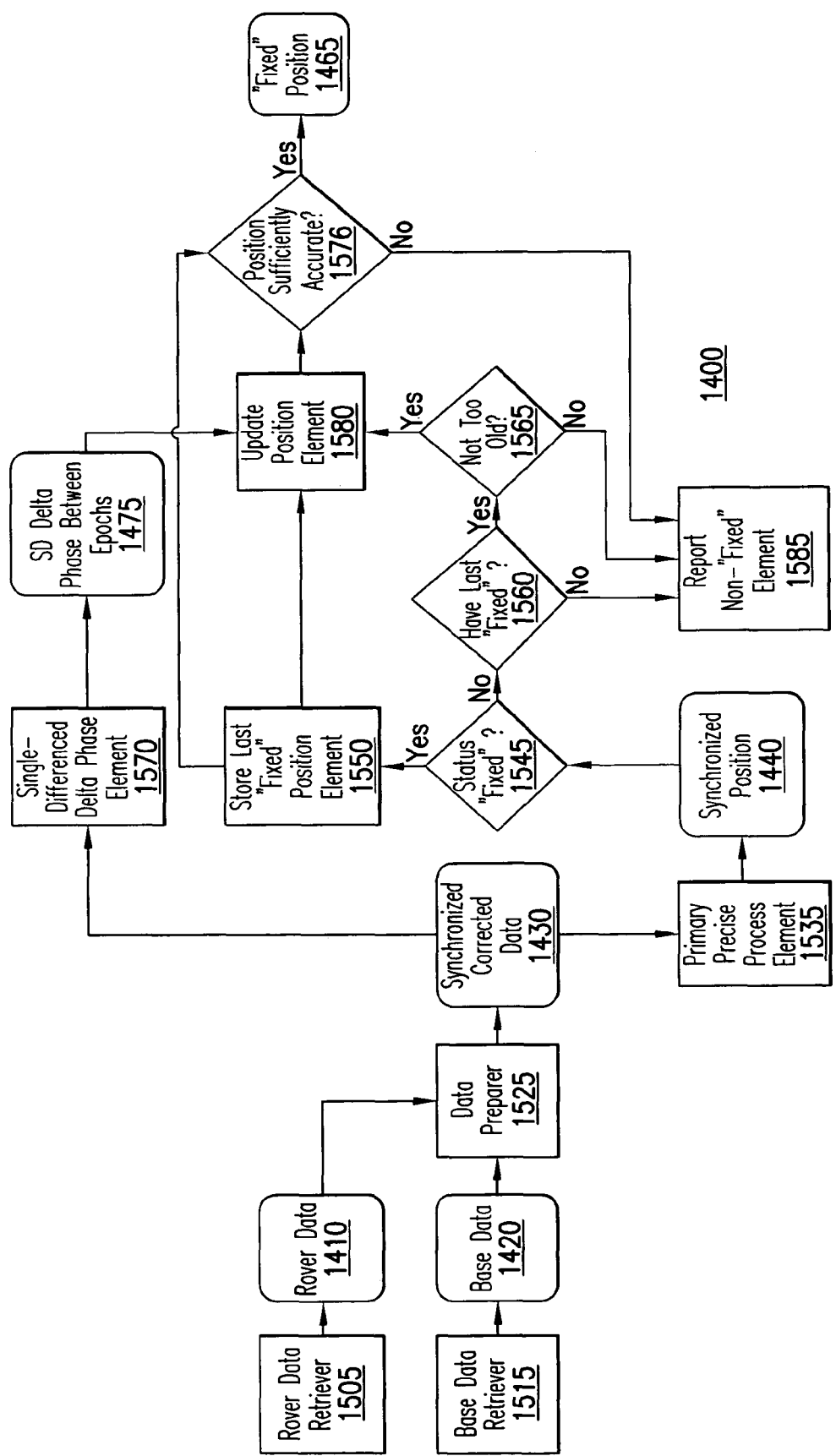
Figure 16:
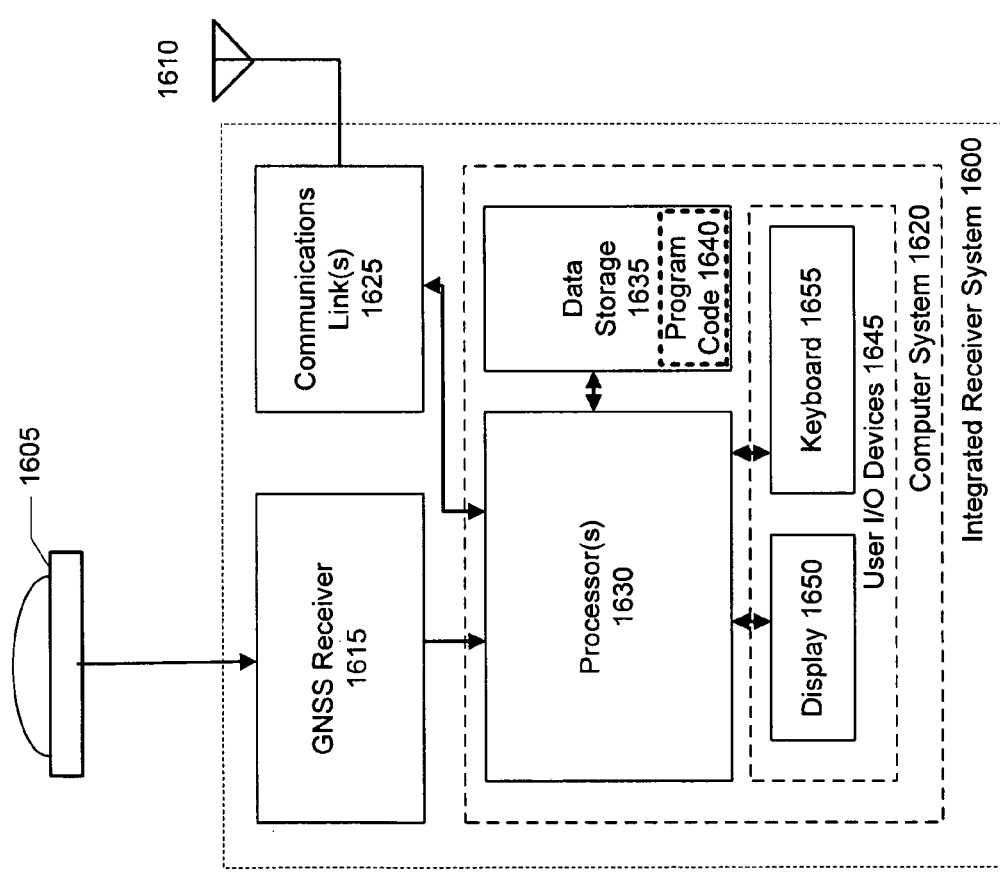
Figure 17:
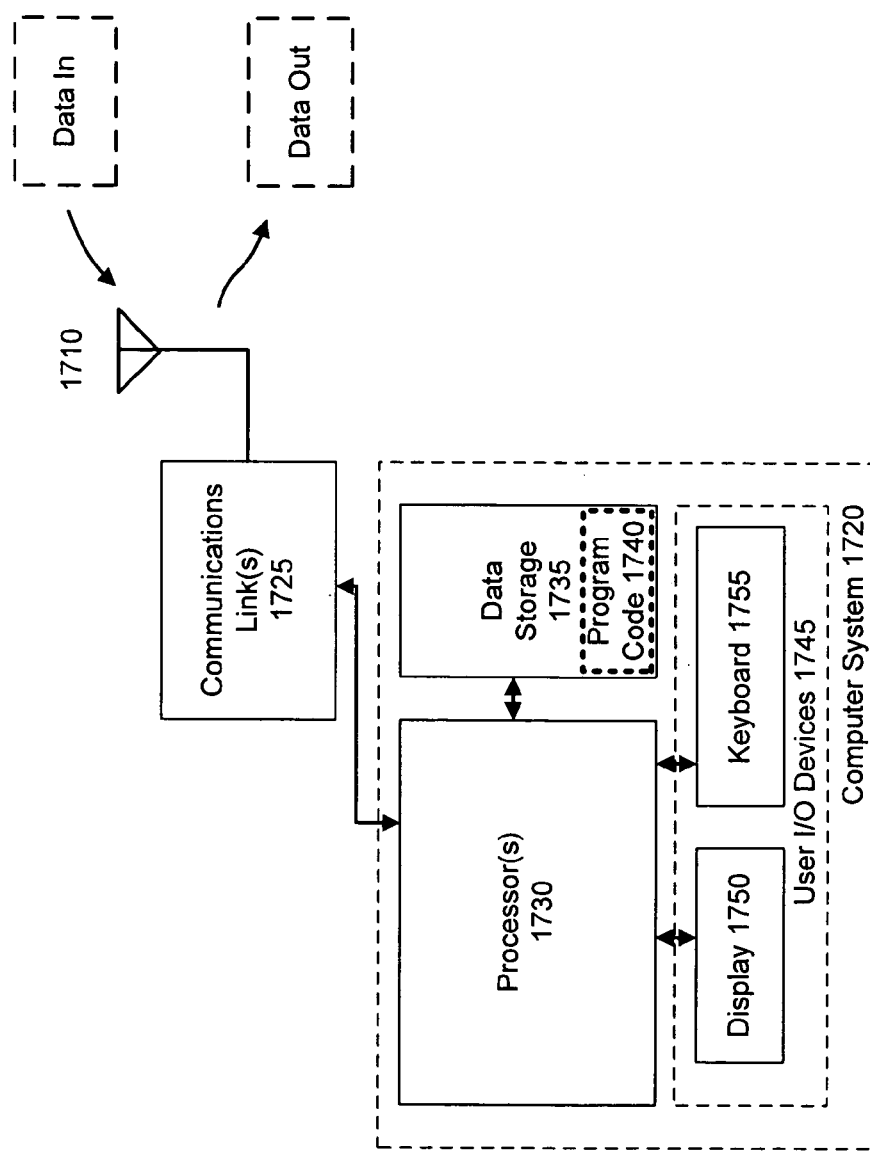

These and other aspects and features of the present invention will be more readily understood from the embodiments described below with reference to the drawings, in which:

FIG. 1 schematically illustrates a typical prior-art GNSS surveying scenario;

FIG. 2 schematically illustrates a prior art processing approach;

FIG. 3 schematically illustrates a prior art processing approach;

FIG. 4 schematically illustrates a prior art processing approach;

FIG. 5 graphically illustrates a sequence of position estimates using the approach of FIG. 4;

FIG. 6 shows in plan view an example of a machine control application in which some embodiments of the invention can be used;

FIG. 7 graphically represents a plan view of the motion of a moving-base receiver antenna and of a rover receiver antenna;

FIG. 8 illustrates in plan view of single-difference delta phase vectors corresponding to FIG. 7;

FIG. 9 schematically illustrates moving base processing in accordance with some embodiments of the invention;

FIG. 10 schematically illustrates a single-differenced delta phase process;

FIG. 11 schematically illustrates moving base processing in accordance with some embodiments of the invention;

FIG. 12 schematically illustrates moving base processing apparatus in accordance with some embodiments of the invention;

FIG. 13 shows a one-dimensional example of weighted-average ambiguity estimation;

FIG. 14 schematically illustrates GNSS position coasting in accordance with some embodiments of the invention;

FIG. 15 schematically illustrates GNSS position coasting apparatus in accordance with some embodiments of the invention;

FIG. 16 is a block diagram of a typical integrated GNSS receiver system used in some embodiments of the invention; and FIG. 17 is a schematic diagram of a computer system used in some embodiments.

DETAILED DESCRIPTION

Part 1: Moving Base Concepts

An important machine control application of RTK GNSS is the precise positioning of the blade cutting edge of graders, bulldozers, excavators and scrapers. For example, the Trimble MS990 system is an integrated GNSS receiver/antenna which can be mounted on masts located at either end of the cutting blade. One of these is considered a "master" (moving base) and the other a "slave" (rover).

FIG. 6 shows in plan view an example 600 in which a master unit 605 (moving base) is located on the right side of a blade 610 of a bulldozer 615, and a slave unit 620 (rover) is located on the left side of the blade. The master unit 605 uses corrections from a fixed base receiver 625 to perform RTK positioning and thereby to determine the location of the right end of the blade 610 relative to the fixed base 625. The master unit 605 then transmits its RTK position plus GNSS carrier phase data, for example at 10 Hz, to the slave unit 620 mounted on the other end of the blade 610. The slave unit 620 then computes its location relative to the moving base master unit 605 as indicated by vector 630. This approach can be termed high-update moving base positioning.

Those of skill in the art will recognize that the static base 625 can be implemented as a physical base station, as a virtual reference station with observations constructed from observations of a network of reference stations, as a global virtual reference station ("GVRS" as described for example in Provisional Application for U.S. Patent 61/227,184 filed 19 Feb. 2009), as a synthetic reference station constructed from observations of a regional augmentation network ("SRS" as described for example in Provisional Application for U.S. Patent 61/337,980 filed 14 Feb. 2010 entitled "GNSS Signal Processing with Regional Augmentation" of Xiaoming CHEN et al., or in any other manner which provides the equivalent of observations of a physical base station.

The prior-art Trimble MS990 product uses single-difference positioning techniques to solve for the location of the slave antenna relative to the master at 10 Hz. As shown in (3), single-difference phase observations include a carrier phase ambiguity term which needs to be known in order to produce centimeter-level positioning results.

Some embodiments of the present invention, examples of which are described below, provide a new approach for high-update (>1 Hz) moving base RTK which makes use of the single-difference delta phase observations presented above. In this approach, synchronized moving base vectors are generated at a low rate, for example at 1 Hz using the FSS task. Single-differenced delta phase positioning is used to compute the changes in the moving-base-rover vector at a high rate, for example at 5 Hz, 10 Hz or 20 Hz.

FIG. 7 graphically represents at 700 a plan view of the motion of a moving-base receiver antenna 710 and of a rover receiver antenna 720 (e.g., attached to the ends of a bulldozer blade as in FIG. 6) as a time-series of vectors between moving base antenna 710 and rover antenna 720. Vector 725 represents the relative positions of antennas 710 and 720 at an epoch time k=0.0. Vector 730 represents the relative positions of antennas 710 and 720 at an epoch time k=1.0. The positions of moving base antenna 710 at epoch time k=0.0 and at epoch time k=1.0 are determined using correction data from a static base receiver. The single-difference delta phase processor is used to provide updates to infill the vector estimates generated by the FSS task at epochs 0.0 and 1.0, e.g., at epoch times 0.1, 0.2, ... 0.9.

Using the example of FIG. 7, single-differenced delta phase observations are formed for all satellites in view between the epochs 0.0→0.1; 0.0→0.2; 0.0→0.3; ... 0.0→0.9. For the purposes of the single-differenced delta phase estimation process, the moving base coordinates are assumed to be constant for the period 0.0 ... 1.0 s.

FIG. 8 illustrates in plan view the resultant single-difference delta phase vectors produced for epochs 0.1.0.9 with the moving base coordinates assumed to be constant.

Once the vector estimates derived from the single-difference delta phase processor are computed, they can be combined with the position estimates of the moving base to produce rover coordinates. This process can be explained mathematically as follows.

First, the coordinates of the moving base and rover at epoch 0.0 are given by $$x_b(0.0), y_b(0.0), z_b(0.0), \text{ and} \tag{10}$$

$$x_r(0.0), y_r(0.0), z_r(0.0) \tag{11}$$

respectively.

Let the single-difference delta phase vector estimates produced at epochs 0.1 ... 0.9 be denoted:

$$\delta\Delta x(0.1), \delta\Delta y(0.1), \delta\Delta z(0.1) \tag{12a}$$

$$\delta\Delta x(0.2), \delta\Delta y(0.2), \delta\Delta z(0.2) \tag{12b}$$

$$\delta\Delta x(0.3), \delta\Delta y(0.3), \delta\Delta z(0.3) \tag{12c}$$

$$\ldots$$

$$\delta\Delta x(0.9), \delta\Delta y(0.9), \delta\Delta z(0.9) \tag{12d}$$

The moving base transmits its position to the rover at every (10 Hz) measurement epoch, hence the following moving base coordinates are available:

$$x_b(0.1), y_b(0.1), z_b(0.1) \tag{13a}$$

$$x_b(0.2), y_b(0.2), z_b(0.2) \tag{13b}$$

$$x_b(0.3), y_b(0.3), z_b(0.3) \tag{13c}$$

$$\ldots$$

$$x_b(0.9), y_b(0.9), z_b(0.9) \tag{13d}$$

Finally, the rover coordinates are computed using simple arithmetic using the results from 10 ... 13. For the x-coordinate:

$$x_r(0.1) = \delta\Delta x(0.1) + x_r(0.0) + x_b(0.1) - x_b(0.0) \tag{14a}$$

$$x_r(0.2) = \delta\Delta x(0.2) + x_r(0.0) + x_b(0.2) - x_b(0.0) \tag{14b}$$

$$x_r(0.3) = \delta\Delta x(0.3) + x_r(0.0) + x_b(0.3) - x_b(0.0) \tag{14c}$$

$$\ldots$$

$$x_r(0.9) = \delta\Delta x(0.9) + x_r(0.0) + x_b(0.9) - x_b(0.0) \tag{14d}$$

with analogous expressions for the y and z coordinates.

FIG. 9 schematically illustrates at 900 some embodiments of the moving base processing approach. Multi-frequency GNSS observation data 905 from a rover and multi-frequency GNSS observation data 910 from a moving base are used in a single-differenced delta phase process to determine the rover position 920 relative to the moving base position. The rover position 920 relative to the moving base position defines a vector, such as a vector as shown in FIG. 7 or FIG. 8, without reference to an absolute position.

FIG. 9 further shows optional features in dashed lines. Moving base data 910 and multi-frequency GNSS observation data 925 from a fixed base station are used in a differential process 930 to determine moving base position 935 relative to the fixed base location. The moving base position 920 relative to the fixed base location 935 and the rover position relative to the moving base are combined at 940 to determine a master-slave vector 945 relative to the location of the fixed base. That is, vector 945 defines a heading from moving base to rover, relative to the "absolute" location of the fixed base.

FIG. 10 schematically illustrates at 1000 a single-differenced delta phase process. Base station data 1005 for an epoch k–1 and rover data 1010 for the same epoch k–1 are differenced at 1015 to produce single-differenced carrier-phase data 1020 for epoch k–1. Base station data 1035 for an epoch k and rover data 1040 for the same epoch k are differenced at 1045 to produce single-differenced carrier-phase data 1050 for epoch k. The single-differenced carrier-phase data for epoch k–1 and the single-differenced carrier-phase data for epoch k are differenced at 1055 to obtain the single-differenced delta phase data 1060 between epoch k–1 and epoch k.

FIG. 11 schematically illustrates moving base processing in accordance with some embodiments of the invention. At 1105 rover data 1110 is obtained. At 1115 fixed-base data 1120 is obtained. At 1125 moving-base data 1130 is obtained. The data sets are prepared at 1135, e.g., matching the data by epoch to obtain synchronized corrected data 1140. At 1145 a primary precise process generates a synchronized rover position 1150 for each epoch. At 1155 the status of each epoch's synchronized rover position 1150 is checked to determine whether it is based on "fixed" ambiguities. If yes, then at 1160 this position is stored as a last "fixed" position 1165.

The term "fixed" position is not intended to suggest that the rover position is static. Rather, the terms "fix," "fixed" and "fixing" as used herein include fixing of ambiguities to integer values using techniques such as rounding, bootstrapping and Lambda search, and also to include forming a weighted average of integer candidates while not necessarily fixing them to integer values. The weighted average approach is described in detail in International patent applications PCT/US2009/004476, PCT/US2009/004472, PCT/US2009/004474, PCT/US2009/004473, and PCT/US2009/004471, incorporated herein by reference. Some embodiments "fix" ambiguities using any suitable techniques known in the art, such as Simple rounding, Bootstrapping, Integer Least Squares based on the Lambda Method, or Best Integer Equivariant. See Teunissen, P. J. G, S. Verhagen (2009); *GNSS Carrier Phase Ambiguity Resolution: Challenges and Open Problems*, in M. G. Sideris (ed.); Observing our Changing Earth, International Association of Geodesy Symposia 133, Springer Verlag Berlin-Heidelberg 2009; and Verhagen, Sandra (2005): The GNSS integer ambiguities: estimation and validation, Publications on Geodesy 58, Delft, 2005, 194 pages, ISBN-13: 978 90 6132 290 0. ISBN-10: 90 6132 290 1.

If the check at 1155 indicates that the status of the latest synchronized position 1150 is not "fixed" then a check is made at 1170 to determine whether a last "fixed" position is available, e.g., a stored "fixed" position 1165 of a prior epoch. If yes, then at 1175 a check is made whether the available last "fixed" position is too old, e.g., whether the error associated with delta phase updates would result in an unacceptably low accuracy. A single-differenced delta phase process 1180 (e.g., as shown in FIG. 10) prepares single-differenced delta phase updates 1185. If at 1175 the last "fixed" position 1165 is determined to be not too old, it is updated at 1190 using the single-differenced delta phase updates 1185. A further check on the precision of the updated position is made at 1176. If the updated position from 1190 is sufficiently accurate to be deemed "fixed", then at 1192 the "fixed" position 1165 and the moving base position 1130 are combined to generate a vector 1195 between these positions relative to a location represented by the base data 1115. The vector 1195 can indicate, for example, a heading of a ship or vehicle, or an orientation of a blade of a bulldozer or grading machine.

If at 1170 no last "fixed" position is available or if at 1175 the last "fixed" position is too old, or if the updated position is insufficiently accurate, then at 1198 the last position is reported as non-"fixed" and at 1192 correspondingly less accurate vector 1195 can be computed, and optionally flagged as below the desired level of accuracy.

FIG. 12 schematically illustrates moving base processing apparatus in accordance with some embodiments of the invention. An element 1205 retrieves rover data 1110. An element 1215 retrieves fixed-base data 1120. An element 1225 retrieves moving-base data 1130. A data preparation element 1235 prepares the data sets, e.g., matching the data by epoch to obtain synchronized corrected data 1140. A primary precise processing element 1245 generates a synchronized rover position 1150 for each epoch. An element 1255 checks the status of each epoch's synchronized rover position 1150 to determine whether it is based on "fixed" ambiguities. If yes, then an element 1260 stores this position as a last "fixed" position 1165.

If element 1255 determines that the status of the latest synchronized position 1150 is not "fixed" then an element 1270 checks whether a last "fixed" position is available, e.g., a stored "fixed" position 1165 of a prior epoch. If yes, then an element 1275 checks whether the available last "fixed" position is too old, e.g., whether the error associated with delta phase updates would result in an unacceptably low accuracy. A single-differenced delta phase processing element 1280 (e.g., operating as shown in FIG. 10) prepares single-differenced delta phase updates 1185. If element 1275 determines that the last "fixed" position 1165 is not too old, it is updated by an update-position element 1290 using the single-differenced delta phase updates 1185. A further check on the precision of the updated position is made at 1276. If the updated position is sufficiently accurate to be deemed "fixed", then a compute-vector element 1292 combines the "fixed" position 1165 and the moving base position 1130 to generate a vector 1195 between these positions relative to a location represented by the base data 1115.

If element 1270 determines that no last "fixed" position is available or if element 1275 determines that the last "fixed" position is too old, or if the updated position from 1290 is insufficiently accurate, then the report non-"fixed" element 1298 reports the position as non-"fixed" and compute-vector element 1292 computes a correspondingly less accurate vector 1195, and optionally flags the vector as being below the desired level of accuracy.

Part 2: GNSS Position Coasting: Bridging Fixed Solution Outages

The quality of the reported delta phase positions is only as good as the underlying unambiguous position estimates produced by the FSS task. Hence if the FSS is only producing float (meter-level) solutions, then the delta phase positions derived from it will also only be good to meter-level. The utmost accuracy is achieved when the FSS task produces fixed solutions. Unfortunately fixed status may be lost from time-to-time due to transient errors on rising or setting satellites etc. It would be advantageous to be able to bridge fixed solutions when they are lost for short periods of time.

The classical approach to carrier phase based GNSS data processing is to obtain the best integer ambiguities and then use these to compute the position of the rover. Once the carrier phase ambiguities are fixed to the correct integer values, the resultant position is readily estimated and is generally good to cm-level. A weighted-average processing technique (see for example International Patent Application PCT/US/2009/004476 filed 5 Aug. 2009) is an alternative to the classical approach. With a weighted-average approach, the integer nature of the carrier phase ambiguities is exploited without explicitly fixing to the best candidate set. The weighted-average ambiguities are given by the weighted combination of all possible integer ambiguity candidates.

FIG. 13 shows at 1300 a simple one-dimensional example of weighted-average ambiguity estimation. In FIG. 13 the x-axis is taken in the direction of satellite to receiver. The y-axis represents the probability associated with the ambiguity candidate. The integer ambiguity candidates: 8, 9, 10, 11 & 12 shown, have associated probabilities (normalized weights) as provided in Table I:

| Ambiguity Candidate | Normalized Weight (Probability) | Ambiguity * Normalized Weight |
|---|---|---|
| 8 | 0.11 | 0.88 |
| 9 | 0.14 | 1.26 |
| 10 | 0.36 | 3.60 |
| 11 | 0.24 | 2.64 |
| 12 | 0.15 | 1.80 |
| Summations | 1.00 | 10.18 |

The weighted-average ambiquity result 1310 for this example is given by the weighted mean of all candidates = 10.18.

The weighted average solution can be computed in the ambiguity-domain and/or in the position domain. In the ambiguity-domain approach, the weighted-average ambiguities for each satellite are computed first and then position estimates are computed from the weighted-average ambiguities. In the position-domain approach, the weighted average of the integer-ambiguity positions is formed. The position-domain approach is more computationally efficient than the ambiguity-domain scheme when estimating the covariance matrix of the solution. This is because the position-domain approach only needs to update a 3×3 covariance matrix, compared with an s×s covariance matrix (s=number of satellites ambiguities, typically >>3) for the ambiguity-domain approach.

GNSS satellites broadcast on multiple frequency bands. In the case of GPS, satellites broadcast on L1, L2 and modernized GPS satellites also on the L5 band. Carrier phase measurements can be simultaneously observed on one or more of the frequency bands to each satellite. Various linear combinations of the multi-band phase measurements can be formed according to the following equation:

$$_c\phi^s = \alpha_{L1}\phi^s + \beta_{L2}\phi^s \quad (15)$$

Where:
$_{L1}\phi^s$ Is the L1 phase observation for satellite s.
$_{L2}\phi^s$ the L2 phase observation for satellite s.
$_c\phi^s$ Multi-frequency carrier phase combination for satellite s.
$\alpha,\beta$ coefficients of the L1 and L2 carrier phase bands respectively.

The coefficients of the carrier-phase frequency bands ($\alpha$, $\beta$) are selected to produce a carrier-phase combination with particular characteristics. For example, the L1/L2 iono-free phase combination essentially eliminates the ionospheric bias. The wide-lane phase combination ($\alpha=1$, $\beta=-1$) is frequently used for ambiguity resolution applications, because of its long (~86 cm for GPS L1/L2) effective wavelength.

The linear carrier-phase combinations described above can be applied to undifferenced, single-differenced, delta-differenced, double-differenced data etc. In the case of single-differenced delta phase processing, the iono-free carrier-phase combination is useful when the base-rover separation is large, i.e. when the ionospheric effect is high. The single-difference iono-free delta phase combination is derived from (5):

$$\delta\Delta_{IF}\phi^s(k) = \delta\Delta\rho^s(k) + \delta\Delta t(k) + \delta\Delta\tau^s(k) \quad (16)$$

Notice that the iono-bias term is absent from (16). The receiver position and clock terms in (16) are directly estimated, while the only remaining unknown on the right-hand side is the tropospheric bias. Fortunately the tropospheric bias term is well modeled and generally changes very slowly with time. Hence the single-difference iono-free delta phase combination is largely unbiased and can therefore be used to estimate the change in receiver position over extended periods of time.

A downside of the iono-free phase combination is that it has relatively high noise, by comparison with say the L1-only phase combination. Therefore, on short baselines (base-rover closely spaced), it is preferable to use for example single-differenced L1-only delta phase for position change estimation, given the relatively low-noise of L1-only data.

FIG. 14 schematically illustrates GNSS position coasting in accordance with some embodiments of the invention. At 1405 rover data 1410 is obtained representing GNSS carrier-phase observations on multiple frequencies at a rover location. At 1415 base station data 1420 is obtained, which may be correction data from a physical base station, a virtual reference station, a global virtual reference station, a synthetic reference station (all as discussed above), or other source. The data sets are prepared at 1425, e.g., matching the data by epoch to obtain synchronized corrected data 1430. At 1435 a primary precise process generates a synchronized rover position 1440 for each epoch.

Synchronized rover position 1440 may be based on a single fixed ambiguity set or on a weighted combination of ambiguity candidate sets, but may or may not be of sufficient quality to be considered "fixed." At 1445 the status of each epoch's synchronized rover position 1440 is checked to determine whether it is based on "fixed" ambiguities. If yes, then at 1450 this position is stored as a last "fixed" position 1455.

If the check at 1445 indicates that the status of the latest synchronized position 1440 is not "fixed" then a check is made at 1460 to determine whether a last "fixed" position is available, e.g., a stored "fixed" position 1455 of a prior epoch. If yes, then at 1465 a check is made whether the available last "fixed" position is too old, e.g., whether the error associated with delta phase updates would result in an unacceptably low accuracy. A single-differenced delta phase process 1470 (e.g., as shown in FIG. 10) prepares single-differenced delta phase updates 1475. If at 1465 the last "fixed" position 1455 is determined to be not too old, it is updated at 1480 using the single-differenced delta phase updates 1475. A further check on the precision of the updated position is made at 1476. If the updated position is sufficiently accurate to be deemed "fixed", then it is used to update the "fixed" position at 1455. If at 1460 no last "fixed" position is available or if at 1465 the last "fixed" position is too old, or if the updated position from 1480 is insufficiently accurate, then at 1485 the last position is reported as non-"fixed."

FIG. 15 schematically illustrates GNSS position coasting apparatus in accordance with some embodiments of the invention. A rover data retriever element 1505 obtains rover data 1410 representing GNSS carrier-phase observations on multiple frequencies at a rover location. A base data retriever element 1515 obtains base station data 1420, which may be correction data from a physical base station, a virtual reference station, a global virtual reference station, a synthetic reference station (all as discussed above), or other source. A data preparer element 1525 prepares the data sets, e.g., matching the data by epoch to obtain synchronized corrected data 1430. A primary precise process element 1535 generates a synchronized rover position 1440 for each epoch.

An element 1545 checks the status of each epoch's synchronized rover position 1440 to determine whether it is based on "fixed" ambiguities. If yes, then an element 1550 stores this position as a last "fixed" position 1455. If element 1545 determines that the status of the latest synchronized position 1440 is not "fixed" then an element 1560 checks whether a last "fixed" position is available, e.g., a stored "fixed" position 1455 of a prior epoch. If yes, then an element 1565 checks whether the available last "fixed" position is too old, e.g., whether the error associated with delta phase updates would result in an unacceptably low accuracy. A single-differenced delta phase process element 1570 (e.g., operating as shown in FIG. 10) prepares single-differenced delta phase updates 1475. If element 1565 determines that the last "fixed" position 1455 is not too old, it is updated by an element 1480 using the single-differenced delta phase updates 1475. A further check on the precision of the updated position is made at 1576. If the updated position is sufficiently accurate to be deemed "fixed", then it is used to update the "fixed" position at 1455 If element 1560 determines that no last "fixed" position is available or if element 1565 determines that the last "fixed" position is too old, or if the updated position from element 1580 is insufficiently accurate, then element 1585 reports the last position as non-"fixed."

Part 3: Receiver and Processing Apparatus

FIG. 16 is a block diagram of a typical integrated GNSS receiver system 1600 with GNSS antenna 1605 and communications antenna 1610. The Trimble R8 GNSS System is an example of such a system. Receiver system 1600 can serve as a rover or base station or reference station. Receiver system 1600 includes a GNSS receiver 1615, a computer system 1620 and one or more communications links 1625. Computer system 1620 includes one or more processors 1630, one or more data storage elements 1635, program code 1640 with instructions for controlling the processor(s) 1630, and user input/output devices 1645 which may include one or more output devices 1650 such as a display or speaker or printer and one or more devices 1655 for receiving user input such as a keyboard or touch pad or mouse or microphone.

FIG. 17 is a schematic diagram of a computer system in accordance with some embodiments of the invention. Computer system 1720 includes one or more processors 1730, one or more data storage elements 1735, program code 1740 with instructions for controlling the processor(s) 1730, and user input/output devices 1745 which may include one or more output devices 1750 such as a display or speaker or printer and one or more devices 1755 for receiving user input such as a keyboard or touch pad or mouse or microphone.

Part 4: General Remarks

The inventive concepts can be employed in a wide variety of processes and equipment. Some exemplary embodiments will now be described. It will be understood that these are intended to illustrate rather than to limit the scope of the invention.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. For example, while a iono-free phase combination is employed in some examples, those of skill in the art will recognized that many phase combinations are possible and that a combination other than a iono-free phase combination can produce acceptable if less than optimum results; thus the claims are not intended to be limited to iono-free phase combinations other than where expressly called for. Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of determining a position of an antenna of a GNSS rover from observations of GNSS signals collected at the antenna over multiple epochs and from correction data for at least one of the epochs, comprising:
    determining a first-epoch rover position relative to a base location for a first epoch using a single-differencing process based on one of (i) fixed carrier-phase ambiguities and (ii) a weighted average of carrier-phase ambiguity candidates which is converged to a predetermined threshold,
    determining a second-epoch rover position relative to a base location for a second epoch using a single-differencing process,
    determining a second-epoch update of the first-epoch rover position relative to the base location for the second epoch using a single-differenced delta phase process and combining the first-epoch rover position with the second-epoch update to obtain a second-epoch delta phase rover position relative to a moving base location of the second epoch, and
    selecting as reliable the second-epoch delta phase rover position if the second-epoch rover position is not based on one of (i) fixed carrier-phase ambiguities and (ii) a weighted average of carrier-phase ambiguity candidates which is converged to a predetermined threshold.

2. The method of claim 1, wherein the determining a first-epoch rover position uses base correction data comprising at least one of: correction data prepared from observations of a physical base station, correction data prepared from observations of a network of reference stations, correction data prepared from observations of a global network of reference stations, and correction data prepared from observations of a regional network of reference stations.

3. The method of claim 1, further comprising checking accuracy of the second-epoch update of the first-epoch rover position.

4. A computer program product comprising: a computer usable medium having computer readable instructions physically embodied therein, the computer readable instructions when executed by a processor enabling the processor to perform the method of claim 1.

5. Apparatus for determining a position of an antenna of a GNSS rover from observations of GNSS signals collected at the antenna over multiple epochs and from correction data for at least one of the epochs, comprising at least one processor with instructions enabling the at least one processor to
    determine a first-epoch rover position relative to a base location for a first epoch using a single-differencing process based on one of (i) fixed carrier-phase ambiguities and (ii) a weighted average of carrier-phase ambiguity candidates which is converged to a predetermined threshold,
    determine a second-epoch rover position relative to a base location for a second epoch using a single-differencing process,
    determine a second-epoch update of the first-epoch rover position relative to the base location for the second epoch using a single-differenced delta phase process and combining the first-epoch rover position with the second-epoch update to obtain a second-epoch delta phase rover position relative to a moving base location of the second epoch, and
    select as reliable the second-epoch delta phase rover position if the second-epoch rover position is not based on one of (i) fixed carrier-phase ambiguities and (ii) a weighted average of carrier-phase ambiguity candidates which is converged to a predetermined threshold.

6. The apparatus of claim 5, wherein the instructions further enable the at least one processor to determine a first-epoch rover position using base correction data comprising at least one of: correction data prepared from observations of a physical base station, correction data prepared from observations of a network of reference stations, correction data prepared from observations of a global network of reference stations, and correction data prepared from observations of a regional network of reference stations.

* * * * *